(12) United States Patent
Wang et al.

(10) Patent No.: US 12,486,245 B2
(45) Date of Patent: Dec. 2, 2025

(54) SEQUENTIAL MULTI-STEP FLASH NANOPRECIPITATION FOR THE FORMATION OF NANOPARTICLES WITH HIGH CORE LOADINGS

(71) Applicant: The Trustees of Princeton University, Princeton, NJ (US)

(72) Inventors: Leon Wang, Princeton, NJ (US); Kurt Ristroph, Princeton, NJ (US); Robert Prud'homme, Lawrenceville, NJ (US)

(73) Assignee: THE TRUSTEES OF PRINCETON UNIVERSITY, Princeton, NJ (US)

( * ) Notice: Subject to any disclaimer, the term of this patent is extended or adjusted under 35 U.S.C. 154(b) by 822 days.

(21) Appl. No.: 17/770,393

(22) PCT Filed: Oct. 14, 2020

(86) PCT No.: PCT/US2020/055523
§ 371 (c)(1),
(2) Date: Apr. 20, 2022

(87) PCT Pub. No.: WO2021/080827
PCT Pub. Date: Apr. 29, 2021

(65) Prior Publication Data
US 2022/0370373 A1    Nov. 24, 2022

Related U.S. Application Data

(60) Provisional application No. 62/923,939, filed on Oct. 21, 2019.

(51) Int. Cl.
| | |
|---|---|
| *C07D 401/04* | (2006.01) |
| *A61K 9/51* | (2006.01) |
| *A61K 31/4439* | (2006.01) |
| *A61K 31/4545* | (2006.01) |
| *A61K 45/06* | (2006.01) |
| *C07D 401/14* | (2006.01) |

(52) U.S. Cl.
CPC .......... *C07D 401/04* (2013.01); *A61K 9/5146* (2013.01); *A61K 9/5161* (2013.01); *A61K 9/5192* (2013.01); *A61K 31/4439* (2013.01); *A61K 31/4545* (2013.01); *A61K 45/06* (2013.01); *C07D 401/14* (2013.01)

(58) Field of Classification Search
CPC .. C07D 401/04; C07D 401/14; A61K 9/5146; A61K 9/5161; A61K 9/5192; A61K 31/4439; A61K 31/4545; A61K 45/06
See application file for complete search history.

(56) References Cited

U.S. PATENT DOCUMENTS

| | | | | |
|---|---|---|---|---|
| 5,832,931 | A | * | 11/1998 | Wachter ............. A61K 49/0017 600/300 |
| 9,943,490 | B2 | * | 4/2018 | Prud'homme ..... A61K 49/0065 |
| 2001/0036480 | A1 | | 11/2001 | Etter |
| 2004/0091546 | A1 | * | 5/2004 | Johnson ............. B01F 35/2213 424/501 |
| 2012/0164072 | A1 | | 6/2012 | Linder et al. |
| 2016/0193125 | A1 | | 7/2016 | Jones et al. |
| 2017/0209386 | A1 | | 7/2017 | Pagels et al. |

FOREIGN PATENT DOCUMENTS

WO      2019090030 A1     9/2019

OTHER PUBLICATIONS

Giulio Jori, "Tumour photosensitizers: approaches to enhance the selectivity and efficiency of photodynamic therapy", Journal of Photochemistry and Photobiology B: Biology, 36 (1996), 87-93 (Year: 1996).*
Dongfei Liu, Hongbo Zhang, Salvatore Cito, Jin Fan, Ermei Makila, Jarno Salonen, Jouni Hirvonen, Tiina M. Sikanen, David A. Weitz and Helder A. Santos, "Core/Shell Nanocomposites Produced by Superfast Sequential Microfluidic Nanoprecipitation", Nano Letters, 2017, 17, 606-614 (Year: 2017).*
International Search Report and Written Opinion for corresponding PCT Application No. PCT/US2020/055523, dated Feb. 11, 2021.
D'Addio, Suzanne M. and Prud'homme, Robert K., "Controlling drug nanoparticle formation by rapid precipitation," Advanced Drug Delivery Reviews, vol. 63, pp. 417-426, May 30, 2011.
Gould, Philip L. et al., "Polymers for biodegradable medical devices. IV. Hydroxybutyrate-valerate copolymers as non-disintegrating matrices for controlled-release oral dosage forms," International Journal of Pharmaceutics, vol. 38, pp. 231-237, Aug. 1987.
Johnson, Brian K. and Prud'homme, Robert K., "Chemical processing and micromixing in confined impinging ets," AIChE Journal, vol. 49, No. 9, pp. 2264-2282, Sep. 1, 2003.

(Continued)

*Primary Examiner* — Mina Haghighatian
*Assistant Examiner* — Nathan W Schlientz
(74) *Attorney, Agent, or Firm* — Meagher Emanuel Laks Goldberg & Liao, LLP

(57) ABSTRACT

From diagnostic imaging to drug delivery, nanoparticles have found a tremendous variety of uses across fields. Often, when designing these nanoscale constructs, the two most important criteria are particle size and core loading. For example, small particles below 100 nm can have many advantages for drug delivery—including improved specificity to tumors through the enhanced permeability and retention (EPR) effect. Likewise, higher loading nanoparticles translate very well to more effective drug delivery and cancer imaging—allowing for lower dosage and reduced costs. Traditional formulations of nanoparticles using drug absorption or precipitation methods generally struggle to obtain >50% loading. Disclosed herein is a precipitation process allowing for production of stable particles at very high core loading by taking advantage of different time scales while maintaining biologically relevant sizes. New mixing designs allow for the separation of the precipitation and stabilization steps to generate these high loading nanoparticles.

27 Claims, 12 Drawing Sheets

(56) References Cited

OTHER PUBLICATIONS

Liu, Ying and Fox, R.O., "CFD predictions for chemical processing in a confined impinging-jets reactor," AIChE Journal, vol. 52, No. 2, pp. 731-744, Feb. 2006.

Markwalter, Chester E. and Prud'homme, Robert K., "Inverse Flash NanoPrecipitation for Biologics Encapsulation: Understanding Process Losses via an Extraction Protocol," ACS Symposium Series, vol. 1271, pp. 275-296, Nov. 15, 2017.

Pagels, Robert F. and Prud'homme, Robert K., "Polymeric nanoparticles and microparticles for the delivery of peptides, biologics, and soluble therapeutics," Journal of Controlled Release, vol. 219, pp. 519-535, Dec. 10, 2015.

Pagels, Robert F. and Prud'homme, Robert K., "Inverse Flash NanoPrecipitation for Biologics Encapsulation: Nanoparticle Formation and Ionic Stabilization in Organic Solvents," ACS Symposium Series, vol. 1271., pp. 249-274, Nov. 15, 2017.

Pitt, C.G., "The controlled parenteral delivery of polypeptides and proteins," International Journal of Pharmaceutics, vol. 59, pp. 173-196, Mar. 30, 1990.

Saad, Walid S. and Prud'homme, Robert K., "Principles of nanoparticle formation by flash nanoprecipitation," Nano Today, vol. 11, No. 2, pp. 212-227, Apr. 2016.

Lavasanifar, A., et al., "Poly(ethylene oxide)-block-poly(L-amino acid) micelles for drug delivery," Advanced Drug Delivery Reviews, vol. 54, pp. 169-190, Feb. 21, 2002.

\* cited by examiner

SEQUENTIAL MULTI-STEP FLASH NANOPRECIPITATION FOR THE FORMATION OF NANOPARTICLES WITH HIGH CORE LOADINGS

CROSS-REFERENCE TO RELATED APPLICATIONS

This application claims priority to U.S. Provisional Patent Application No. 62/923,939, filed Oct. 21, 2019, which is herein incorporated by reference in its entirety.

TECHNICAL FIELD

The present invention relates to processes to produce nanoparticles with high loadings of actives using two sequential confined, continuous, mixing chambers connected in series. In the first mixing chamber the nanoparticle core material nucleates and forms the nanoparticle core. In the second mixing chamber, the stabilizing amphiphilic stabilizer is applied. The delay time between the first and second mixing chamber is 10 ms to 10,000 ms. This novel two-step process produces smaller nanoparticles, at higher loadings, than can be achieved with similar solids compositions using a single confined, continuous mixing chamber.

BACKGROUND

For many drug formulations, aqueous solutions are desirable, but the agents to be delivered are hydrophobic. Formulations of nanoparticles using stabilized emulsions or drug absorption methods generally struggle to obtain >10% loading. Recently, technologies utilizing metal-organic frameworks (MOFs) as carriers have been able to achieve higher core loadings of up to 35% (See, Li et al., Facile preparation of magnetic metal-organic frameworks core-shell nanoparticles for stimuli-responsive drug carrier. Nanotechnology 2017, 28 (49)). For this, porous nanoparticles must be synthesized to have enormous internal surface areas (~100 $m^2 g^{-1}$) in order to optimize for drug absorption.

Therefore, methods for stabilizing nanoparticles having even greater loading capability are therefore useful and desirable, especially methods for encapsulating hydrophobic agents or hydrophobic ion-pair agents.

BRIEF SUMMARY

The disclosed methods encapsulate hydrophobic agents or hydrophobic ion-pair agents as nanoparticles, which involve continuously mixing a first stream containing the agent in a first solution with a second stream containing an amphiphilic stabilizer in a second solution, and that mixing forms the stabilized nanoparticle. In some cases, the first stream is a result of combining a hydrophobic agent in a first solution with a more polar antisolvent stream. In other cases, the first stream is a result of two streams being formed and then continuously mixed in order to generate a stream containing the hydrophobic ion-pair agents.

The first disclosed method is a method for encapsulating a hydrophobic agent. The method involves at least four steps: (1) dissolving the hydrophobic agent in a less polar process solvent to form a first process solution; (2) dissolving an amphiphilic stabilizer in a less polar process solution to form a second process solution, the amphiphilic stabilizer comprising at least one less polar region and at least one more polar region; (3) continuously mixing the first process solution with a more polar antisolvent stream to form a mixed solution; (4) continuously mixing the mixed solution with the second process solution to form a stabilized nanoparticle. The nanoparticle comprises a core and a shell, where the core comprises the hydrophobic active, and the shell comprises the at least one less polar region of the amphiphilic stabilizer.

Optionally, steps (c) and (d) are conducted in a different confined mixing chambers wherein each chamber has two or more inlets and an exit whereby the solution streams continuously flow into and out of the mixing chambers. Optionally, a delay time is introduced between the two mixing chambers, such 5 ms to 1 min, or 10 ms to 0.1 min. Optionally, the mixed solution is transported to a location where the second process solution is mixed via tubing, and at least one dimension of the tubing is used to create a controlled delay time between mixing. Optionally, the mixing occurs within multiple confined impingement jet (CM) mixers connected in series. Optionally, the mixing occurs within a confined impingement jet (CIJ) mixer connected to a multi-inlet vortex mixer (MIVM).

Optionally, the amphiphilic stabilizer is selected from the group consisting of a random copolymer, a block copolymer, a diblock copolymer, a triblock copolymer, a multiblock copolymer, and a branched-comb copolymer. Optionally, the at least one less polar region of the amphiphilic stabilizer comprises poly(styrene), polylactic acid), polylactic-co-glycolic acid), or poly(caprolactone), and/or the at least one more polar region of the amphiphilic stabilizer comprises poly(aspartic acid), poly(glutamic acid), poly(ethylene glycol). Optionally, the amphiphilic stabilizer includes a cellulosic polymer, such as hydroxypropyl cellulose, methyl cellulose, ethyl methyl cellulose, hydroxypropylmethyl cellulose (HPMC), or carboxymethyl cellulose, and/or. The cellulosic polymer includes hydroxypropyl, hydroxyethyl, hydroxymethyl, succinate, and/or acetate substitutions.

Optionally, the less polar process solvent is selected from the group consisting of acetone, an alcohol, methanol, ethanol, n-propanol, isopropanol, tetrahydrofuran, dimethyl sulfoxide, and combinations thereof. Optionally, the more polar anti-solvent is selected from the group consisting of water, an alcohol, and combinations thereof, and the more polar anti-solvent may contain dissolved salts or buffers, which may optionally be selected from the group consisting of sodium chloride, potassium chloride, phosphate buffers, acetate buffers, and combinations thereof.

Optionally, the hydrophobic agent has a molecular weight of from about 100 g/mol to about-5000 g/mol. Optionally, the hydrophobic agent has a solubility in water of from about 0.001 mg/L to about 100 mg/L. Optionally, the hydrophobic agent has a log P of from about 3.5 to about 12. Optionally, the hydrophobic agent is selected from the group consisting of polystyrene homopolymer (PS), polycaprolactone homopolymer (PCL), polylactic acid (PLA), lumefantrine, clofazimine, cyclosporine A, itraconazole, artefenomel, artefenomel mesylate, tocopherol, tocopheryl acetate, and combinations. Optionally, the hydrophobic agent is 1,4,8,11,15,18,22,25-Octabutoxy-29H,31H-phthalocyanine (762Pc).

Optionally, the nanoparticle is fluorescent when excited at between 500 nm and 800 nm and excites at above 800 nm, and/or the nanoparticle has a size ranging from about 10-nm to about 5000 nm. Optionally, the nanoparticle comprises weight fraction of hydrophobic active from about 50% to 95% w/w. Optionally, the nanoparticle size does not change by more than about 50% over 48 hours in aqueous solution. Optionally, the nanoparticle size does not change by more than about 50% over 9 months in aqueous solution.

Also disclosed is a method for encapsulating an ion-paired agent. The process is similar to the above-described process, with an extra step to form the hydrophobic ion pair. Specifically, the method comprises five steps: (1) dissolving a charged hydrophilic ion in a more polar solvent to form a primary process solution; (2) dissolving a counter ion in a more polar or less polar solvent to form a secondary process solution; (3) dissolving an amphiphilic stabilizer in a less polar process solution to form a tertiary process solution; (4) continuously mixing the first process solution with the second process solution to form a mixed solution wherein a hydrophobic ion-pair is formed; and (5) continuously mixing the mixed solution with the tertiary process solution to form a stabilized nanoparticle. The nanoparticle comprises a core and a shell, the core comprises the hydrophobic ion-pair, and the shell comprises the less polar region of the amphiphilic stabilizer.

Optionally, steps (d) and (e) are conducted in a different confined mixing chamber wherein each chamber has two or more inlets and an exit whereby the solution streams continuously flow into and out of the mixing chambers. Optionally, a delay time is introduced between the two mixing chambers, such 5 ms to 1 min, or 10 ms to 0.1 min. Optionally, the mixed solution is transported to a location where the second process solution is mixed via tubing, and at least one dimension of the tubing is used to create a controlled delay time between mixing. Optionally, the mixing occurs within multiple confined impingement jet (CM) mixers connected in series. Optionally, the mixing occurs within a confined impingement jet (CIJ) mixer connected to a multi-inlet vortex mixer (MIVM).

Optionally, the amphiphilic stabilizer is selected from the group consisting of a random copolymer, a block copolymer, a diblock copolymer, a triblock copolymer, a multiblock copolymer, and a branched-comb copolymer. Optionally, the at least one less polar region of the amphiphilic stabilizer comprises poly(styrene), polylactic acid), polylactic-co-glycolic acid), or poly(caprolactone), and/or the at least one more polar region of the amphiphilic stabilizer comprises poly(aspartic acid), poly(glutamic acid), poly(ethylene glycol). Optionally, the amphiphilic stabilizer includes a cellulosic polymer, such as hydroxypropyl cellulose, methyl cellulose, ethyl methyl cellulose, hydroxypropylmethyl cellulose (HPMC), or carboxymethyl cellulose, and/or. The cellulosic polymer includes hydroxypropyl, hydroxyethyl, hydroxymethyl, succinate, and/or acetate substitutions.

Optionally, the less polar process solvent(s) are selected from the group consisting of acetone, an alcohol, methanol, ethanol, n-propanol, isopropanol, tetrahydrofuran, dimethyl sulfoxide, and combinations thereof. Optionally, the more polar anti-solvent is selected from the group consisting of water, an alcohol, and combinations thereof, and the more polar anti-solvent may contain dissolved salts or buffers, which may optionally be selected from the group consisting of sodium chloride, potassium chloride, phosphate buffers, acetate buffers, and combinations thereof.

Optionally, the charged hydrophilic ion consists of small molecules, peptides, or proteins that contain one or more charged anionic or cationic group, which may optionally be selected from the group consisting of oleic acid, polymyxin b, sodium dodecyl sulfate, cinnarizine, pamoic acid, and combinations thereof. Optionally, the counter-ion consists of small molecules, lipids, surfactants, detergents, or polymers that contain one or more charged anionic or cationic group.

Optionally, the nanoparticle has a size ranging from about 10-nm to about 5000 nm, and/or the nanoparticle comprises weight fraction of hydrophobic active from about 1% to 99% w/w.

DETAILED DESCRIPTION

Figure 1:
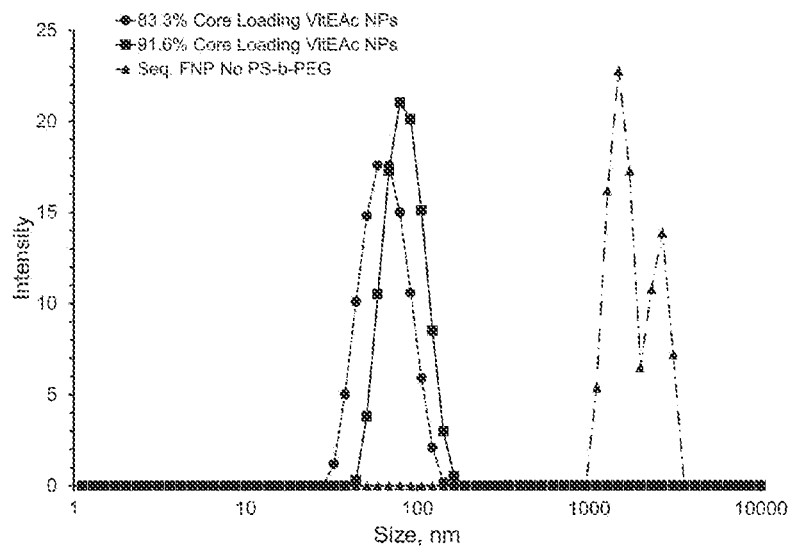
FIG. 1. Graph of DLS signal, indicating particle size distribution (PSD) of tocopheryl acetate ("VitEAc") core nanoparticles made with a sequential FNP system with two connected confined impingement mixers (CIJ-CIJ). If no PS-b-PEG stabilizer was added, the DLS measurement indicated aggregation and no nanoparticle formation. The mean size of the particles as determined by DLS was as follows: [83.3% VitEAc NPs]=61.49 nm; [91.6% VitEAc NPs]=81.05 nm; [No Stabilizer]=3190 nm.

As used herein, the term "nanoparticle" means a solid core particle with a diameter between 10-5000 nm. The size of particles between 10-600 nm can be measured by dynamic light scattering (DLS). The particles analyzed in this patent application are measured using dynamic light scattering in a Malvern Nanosizer, and the size is the z-weighted size reported using the normal mode analysis program provided by the instrument. For mode sizes between 600 and 5000 nm the size is best determined by transmission electron microscopy and is obtained by measuring on the order of 100 particles and producing a histogram.

As used herein, "Flash NanoPrecipitation (FNP)" refers to a process that combines rapid micromixing in a confined geometry of miscible solvent and antisolvent streams to effect high supersaturation of components. This high supersaturation leads to rapid precipitation and growth of the resulting nanoparticles. A stabilizing agent in the formulation accumulates on the surface of the nanoparticle and halts growth at a desired size. The process has previously been described in further detail (see D'addio et al., Controlling drug nanoparticle formation by rapid precipitation. Advanced drug delivery reviews 2011, 63 (6), 417-426; Johnson et al., Process and apparatuses for preparing nanoparticle compositions with amphiphilic copolymers and their use; Saad at al., Principles of nanoparticle formation by flash nanoprecipitation. Nano Today 2016, 11 (2), 212-227). These references are incorporated by reference herein in their entirety.

The Flash NanoPrecipitation process involves a confined mixing volume having one or more solvent streams entering the mixing volume, one or more antisolvent streams entering the mixing volume, and an exit stream (leaving the mixing volume) for the process. The velocity of the inlet streams into the confined mixing volume can be between about 0.01 m/s and 100 m/s, or about 0.1 m/s and 50 m/s, or about 0.1 m/s and 10 m/s. The velocities of the streams may be equal to one another, or they may have different velocities. In the case of unequal velocities, the velocity of the highest velocity stream is the specified velocity.

As used herein, the term "Active" refers to the component or material which confers the desired performance or result. This may be a pharmaceutical active (e.g., a drug, a therapeutic, or a diagnostic (e.g., tracing) material), a fragrance, a cosmetic, a pesticide, an herbicide, an ink or a dye, a molecule or composition that enables covert security labeling, or a molecule or composition that registers a change in color when undergoing some process event.

As used herein, the term "size" refers to a characteristic length of a nanoparticle or a hydrophobic nanoparticle. In the context of this disclosure, the term "size" refers to the z-weighted size of a distribution of nanoparticles or hydrophobic nanoparticles as determined by dynamic light scattering (DLS).

As used herein, the term "core loading" refers to the weight percent of hydrophobic or ion-paired core material relative to the total mass in the formulation. For example, in a formulation with hydrophobic core material and an amphiphilic stabilizer material. The % core loading can be calculated as follows: Core Loading $\% = M_{core\ material} / (M_{core\ material} + M_{stabilizer\ material})$.

As used herein, the term "residence time" refers to the delay time between the first mixing step and the second mixing step of the disclosed sequential FNP process. In systems where a tube is used to connect mixing devices (i.e., CIJ mixers), the delay time can be calculated by dividing the total fluid residence volume between the mixing devices ($V_{res}$) by the fluid flow rate (Q). In systems with long delay times, the delay time between exiting the first mixing geometry and injection into the second mixing geometry can be directly measured using a stopwatch or timer.

As used herein, the term "solvent" means an ingredient that can be used to dissolve another ingredient. Solvents include polar and non-polar solvents.

As used herein, the term "polar solvent" refers to a solvent which is more readily miscible with water and polar ingredients. The polarity of a solvent can be assessed by measuring a number of different parameters according to well known methods as described herein (see, e.g., Prizbytek, "High Purity Solvent Guide," Burdick and Jackson Laboratories, Inc., 1980). Polar solvents generally have high dielectric constants, typically dielectric constants greater than at or about 15, such as at or about 15, 16, 17, 18, 19, 20, 21, 22, 23, 24, 25, 26, 27, 28, 29, 30, 31, 32, 33, 34, 35, 40, 45, 50, 55, 60, 65, 70, 75, 80 85, 90, or greater than 90, and generally have high polarity indices, typically greater than at or about 3, such as at or about 3, 4, 5, 6, 7, 8 or 9 or greater than 9. Polar solvents generally have large dipole moments, typically greater than at or about 1.4 Debye, such as at or about, 1.4, 1.5, 1.6, 1.7, 1.8, 1.9, 2.0, 2.1, 2.2, 2.3, 2.4, 2.5, 2.6, 3.0, 3.5, 4 or greater than 4 Debye. Polar solvents include polar protic solvents and polar aprotic solvents. Exemplary polar solvents include, but are not limited to, water, glycerin, and propylene glycol.

As used herein, the term "non-polar solvent" refers to oils and other non-polar ingredients that dissolve non-polar compounds. Typically, the non-polar solvent is an oil that is included in the composition in addition to the non-polar compound. For example, the non-polar solvent typically is not the non-polar compound itself, e.g., is distinct from the non-polar compound. Certain compounds, for example, flaxseed oil and safflower oil, can be non-polar solvents and non-polar compounds, or non-polaractive ingredients. Typically, the non-polar solvent contains one or more oils, typically oils other than the non-polar active ingredient, or oil(s) not contained in the active ingredient. Exemplary non-polar solvents include, but are not limited to, oils, for example, isohexadecane.

Embodiments of the invention are discussed in detail below. In describing embodiments, specific terminology is employed for the sake of clarity. However, the invention is not intended to be limited to the specific terminology so selected. A person skilled in the relevant art will recognize that other equivalent parts can be employed and other methods developed without parting from the spirit and scope of the invention. All references cited herein are hereby incorporated by reference in their entirety as if each had been individually incorporated.

Nanoparticles can be used for both parenteral and oral delivery of therapeutics and pharmaceutical agents. For external applications, nanoparticles are useful for sunscreens, cosmetics, inks, foods, flavors, fragrance applications. Nanoparticles can be applied in imaging, consumer products, and pesticide delivery.

Often, when designing these nanoscale constructs, the two important criteria are particle size and core loading. In particular, small particles below 100 nm can have many advantages for drug delivery—including improved specificity to tumors through the enhanced permeability and retention (EPR) effect. Likewise, higher loading nanoparticles translate very well to more effective drug delivery—allowing for potentially lower dosage. From a medical imaging standpoint, concentration of contrast agents in a small but highly loaded NP could improve imaging sensitivity and allow for earlier detection of diseases.

NanoPrecipitation (FNP) is a previously disclosed process (U.S. Pat. No. 8,137,699) to make nanoparticles with a hydrophobic core and hydrophilic stabilizing shell (See also Johnson, B. K., et al., AICHE Journal (2003) 49:2264-2282). To form the nanoparticles by rapid precipitation processes, the active agents must be dissolved in a water-miscible organic solvent (the resultant organic solution is denoted "the organic stream"). Candidates for organic solvents include but are not limited to those described in U.S. Pat. No. 8,137,699 (2012), which is hereby incorporated by reference in its entirety. Examples are methanol, ethanol, n-propanol, isopropanol, acetone, ethyl acetate, tetrahydrofuran (THF), dimethyl sulfoxide, n-methyl pyrrolidone, or mixtures of these.

An aqueous solvent can be pure water, or can be water mixed with another solvent, such as an alcohol (e.g., methanol, ethanol, n-propanol, isopropanol), or a solute, such as a salt. In some of the following example systems, the hydrophobic active may be capable of forming electrostatically stabilized nanoparticles without the need for a stabilizer. Addition of salts in the aqueous solvent, in this case, serves to tune these electrostatics interactions and prevent self-stabilization.

FNP can be performed using a mixing device such as a Confined Impinging Jet (CM) or a Multi-Inlet Vortex Mixer (MIVM). The CIJ used in the exemplary experiments consists of two opposed 0.5 mm jets of fluid, one organic and one aqueous, fed to a 2.4 mm diameter chamber at a constant rate with their momentum matched. The geometries of the mixers can be scaled as described previously by, e.g., Johnson (see D'addio; Johnson; and Saad)

The MIVM consists of four streams and allows control of both the supersaturation and the final solvent quality by varying stream velocities. It is able to separate the reactive components into different streams prior to mixing. (See, Liu et al, Mixing in a multi-inlet vortex mixer (MIVM) for flash nanoprecipitation. Chemical Engineering Science 2008, 63 (11), 2829-2842, incorporated by reference herein in its entirety.)

The FNP process is facilitated when the hydrophobic materials encapsulated into the core of nanoparticles have a log P of more than 3.5. Log P is a measure of the hydrophobicity of a compound and is defined as the logarithm of the partition coefficient of the compound between octanol and water. The value can be calculated from molecular structure information by computer programs such as MolInspiration. Alternate techniques such as ion pairing can be used to make an active more hydrophobic so that it is amenable to rapid precipitation processes.

An embodiment of the rapid precipitation process involves the FNP process. That is, the process is conducted in a confined mixing volume with the solvent and antisolvent streams entering the confined volume, and the product stream exiting the confined volume. The precipitation is, thus, continuous; a certain total volume will be chosen to inject continuously into the confined mixing volume.

In the FNP process, nanoparticles of sizes ranging from 80 nm to 150 nm with up to 50% core loading can typically be generated. To achieve even higher core loadings, however, the concentration of hydrophobic actives in the organic stream must be increased relative to that of the stabilizer. At loadings above 50%, anchoring efficiency is decreased as more stabilizer is kinetically trapped in the core by the aggregation process (see Pustulka et al., Flash Nanoprecipitation: Particle Structure and Stability. Mol. Pharmaceutics 2013, 4367-4377, incorporated by reference herein in its entirety). This not only reduces the effective amount of available stabilizer but also introduces inefficiencies in the packing of hydrophobic actives in the NP core. The result is larger, less stable, and/or higher polydispersity nanoparticles.

Disclosed herein is a precipitation process allowing for the production of stable particles at high core loading by taking advantage of time scales. For example, these high-loading particles can have weight fraction of the hydrophobic active from about 50% to 95% w/w, or 60% to 95% w/w, or 70% to 95% w/w, or 80% to 95% w/w, or 90% to 95% w/w. In some embodiments, the weight fraction of the hydrophobic active can extend from 1% to 99% w/w. New mixing designs allow for the separation of the precipitation and stabilization steps to generate these high loading nanoparticles while maintaining small sizes (about 20 nm to 500 nm, 60 nm to 200 nm, 60 nm to 150 nm, or 60 nm to 150 nm) for optimal biological properties.

In some embodiments of the invention, the method results in the formation of nanoparticles that can each be considered an encapsulated hydrophobic agent. Generally, a hydrophobic active is dissolved in a less polar solvent to form a primary process solution. The primary process solution is combined with a more polar solvent to precipitate the hydrophobic active to form a secondary process solution. After a delay, the secondary process solution is then introduced to an amphiphilic stabilizer to form nanoparticles. For example, the process solution can be in a process stream, the more polar solvent can be in a more polar solvent stream, the process stream can be continuously combined with the more polar solvent stream in a confined mixing volume, and/or the secondary process solution can exit the confined mixing volume in an exit stream.

In preferred embodiments, the method begins with forming a first process solution, by dissolving the hydrophobic agent in a less polar process solvent (which can include, e.g., organic solvents such as acetone, an alcohol, methanol, ethanol, n-propanol, isopropanol, tetrahydrofuran, dimethyl sulfoxide, or combinations thereof). This first process solution is then continuously mixing with a more polar antisolvent stream (which can include, e.g., water, an alcohol, or combinations thereof, and/or may include dissolved salts or buffers such as sodium chloride, potassium chloride, phosphate buffers, acetate buffers, and combinations thereof) to form a mixed solution. Prior to, or during, the formation of the first process solution or the mixed solution, a second process solution is formed by dissolving an amphiphilic stabilizer in a less polar process solution (which includes a less polar process solvent). The mixed solution is then continuously mixed with the second process solution, which forms a stabilized nanoparticle. The nanoparticle comprises, consists essentially of, or consists of a core and a shell, where the core comprises the hydrophobic active, and the shell comprises the less polar region of the amphiphilic stabilizer.

The hydrophobic material may include any hydrophobic active material or derivative. In FNP, the nanoparticle core material must be substantially insoluble in the antisolvent solution. A wide range of hydrophobic materials has been described.

Hydrophobic materials for encapsulations are those with octanol/water partition coefficients (log P) larger than 3.5 or can be made hydrophobic by ion pairing or conjugation. The log P can be determined experimentally or calculated using software such as Molinspiration. Example core material can include but are not limited to polystyrene homopolymer (PS), polycaprolactone homopolymer (PCL), polylactic acid (PLA), tocopherol acetate, lumefantrine, polymyxin B, and 1,4,8,11,15,18,22,25-Octabutoxy-29H,31H-phthalocyanine (762Pc).

In some embodiments, the hydrophobic material can have a molecular weight of from about 100, 200, 400, 500, 600, 700, 800, 1000, 1200, 1500, 2000, or 3000 g/mol to about 200, 400, 500, 600, 700, 800, 1000, 1200, 1500, 2000, 3000 or 5000 g/mol, including all combinations thereof. In some embodiments, the hydrophobic material can have a solubility in water of from about 0.001, 0.003, 0.01, 0.03, 0.1, 0.2, 0.5, 1, 2, 5, 10, 20, or 50 mg/L to about 0.003, 0.01, 0.03, 0.1, 0.2, 0.5, 1, 2, 5, 10, 20, 50, or 100 mg/L, including all combinations thereof. In some embodiments, the hydrophobic material can have a log P of from about 3.5, 4, 4.5, 5, 5.5, 6, 6.5, 7, 7.5, 8, 8.5, 9, 10, or 11 to about 4, 4.5, 5, 5.5, 6, 6.5, 7, 7.5, 8, 8.5, 9, 10, 11, or 12, including all combinations thereof.

In some embodiments, the hydrophobic material can be polystyrene homopolymer (PS), polycaprolactone homopolymer (PCL), polylactic acid (PLA), lumefantrine, 1,4,8,11, 15,18,22,25-Octabutoxy-29H,31H-phthalocyanine (762Pc), clofazimine, cyclosporine A, itraconazole, artefenomel, artefenomel mesylate, tocopherol, tocopheryl acetate, or other active agents with low water solubility, or combinations thereof.

In an embodiment, the hydrophobic material can be hydrophilic actives that are or have been paired with one or more hydrophobic counter ions. The hydrophilic molecules may be small molecules, peptides, or proteins that contain one or more charged groups (anionic or cationic). The counter ions may be small molecules, lipids, surfactants, detergents, or polymers that contain one or more charged groups (anionic or cationic). The chemistry of two species together is such that when they are exposed to one another, the resulting charged complex precipitates under the solvent conditions produced by the mixer. Examples include OZ439 (cationic small molecule) and oleic acid (anionic fatty acid surfactant), polymyxin b (cationic peptide), and sodium dodecyl sulfate (anionic sulfate surfactant), cinnarizine and pamoic acid, etc.

The amphiphilic stabilizer has components soluble in the external aqueous stream (i.e., hydrophilic, a more polar region) and components that are hydrophobic (i.e., a less polar region), which anchor on the nanoparticle surface.

Example stabilizers can include but are not limited to polystyrene-b-poly(ethylene glycol) (PS-b-PEG), polycaprolactone-b-poly(ethylene glycol) (PCL-b-PEG), polylactic acid-b-poly(ethylene glycol) (PLA-b-PEG), and Hydroxypropyl Methylcellulose Acetate Succinate (HPMC-AS).

The amphiphilic stabilizer may be selected from the group consisting of a random copolymer, a block copolymer, a diblock copolymer, a triblock copolymer, a multiblock copolymer, and a branched-comb copolymer.

For example, the amphiphilic stabilizer can include a di-block copolymer having a hydrophobic and hydrophilic block (i.e., the less polar region and more polar region, respectively). For example, the hydrophobic block (i.e., the less polar region of the amphiphilic stabilizer) can include poly(styrene), polylactic acid), polylactic-co-glycolic acid), poly(caprolactone), or combinations. For example, the hydrophilic (i.e., the more polar region of the amphiphilic stabilizer) block can include poly(aspartic acid), poly(glutamic acid), poly(ethylene glycol), or combinations thereof.

For example, the amphiphilic stabilizer can include a cellulosic polymer (such as a cellulosic polymer substituted with hydrophilic groups). For example, the cellulosic polymer can be hydroxypropyl cellulose, methyl cellulose, ethyl methyl cellulose, hydroxypropylmethyl cellulose (HPMC), carboxymethyl cellulose, or a combination of these. The cellulosic polymer can include hydroxypropyl, hydroxyethyl, hydroxymethyl, succinate, and/or acetate substitution(s).

In some embodiments, the amphiphilic stabilizer may be dissolved in a solvent/solvent stream. For example, the amphiphilic stabilizer may be dissolved in water, acetone, an alcohol, methanol, ethanol, n-propanol, isopropanol, tetrahydrofuran, or combinations thereof.

The nanoparticles that are formed may be fluorescent. Specifically, in some embodiments, the nanoparticles may be fluorescent when excited with one or more wavelengths between 500 nm and 800 nm, and then excites at above 800 nm. Said differently, the nanoparticle may absorb light at one or more wavelengths between 500 nm and 800 nm (including above 500, 600, or 700 nm, and less than 600, 700, or 800 nm, including any combination thereof), and may emit light at one or more wavelengths above 800 nm (including at wavelengths less than 1200 nm, 1100 nm, 1000 nm, or 900 nm).

The nanoparticles that are formed can have a size (e.g., a diameter or a mean diameter) of from about 10 nm to about 5000 nm. For example, a nanoparticle according to the invention can have a size (for example, a diameter, e.g., a mean diameter) of from about 10 nm to about 5000 nm, from about 20 nm to about 700 nm, from about 20 nm to about 500 nm, from about 70 nm to about 160 nm, from about 70 nm to about 100 nm, from about 100 to about 400 nm, from about 100 to about 250 nm, from about 135 nm to about 260 nm, from about 150 to about 160 nm, from about 200 to about 260 nm, or about 310 nm. The nanoparticle can have a size, e.g., a mean diameter, of from about 10, 20, 35, 50, 70, 100, 135, 150, 160, 200, 250, 260, 350, 500, 600, 700, 1000, or 2000 nm to about 20, 35, 50, 70, 100, 135, 150, 160, 200, 250, 260, 350, 500, 600, 700, 1000, 2000, or 5000 nm, including any combination thereof.

Experimental verification has demonstrated the disclosed technology capable of generating stable embodiments of nanoparticles of sizes between about 20 nm to 500 nm, 60 nm to 200 nm, 60 nm to 150 nm, or 60 nm to 120 nm with high loading (50% to 95% w/w, or 60% to 95% w/w, or 70% to 95% w/w, or 80% to 95% w/w, or 90% to 95% w/w) using, e.g., two connected mixer systems.

In an embodiment according to the invention, the hydrophobic agent(s), amphiphilic stabilizer(s), and any other solvents are selected such that the nanoparticle size does not change by more than about 10%, 20%, 30%, 40%, or 50% over 12, 24, 48 hours in aqueous solution.

In an embodiment according to the invention, the hydrophobic agent(s), amphiphilic stabilizer(s), and any other solvents are selected such that the nanoparticle size does not change by more than about 5%, 10%, 20%, 30%, 40%, or 50% over nine months in aqueous solution.

In an embodiment, a dispersion of nanoparticles according to the invention is not an emulsion.

In some embodiments, each continuous mixing step is conducted in a different confined mixing chamber. In preferred embodiments, each mixing chamber has two or more inlets and an exit, and the solution streams continuously flow into and out of the mixing chambers.

In one embodiment, when the mixed solution continuously mixed with the second process solution in a confined mixing volume, the formed nanoparticle may then exit a confined mixing volume in an exit stream.

In embodiments where different mixing chambers are used, a delay time may be introduced between two of the mixing chambers. In an embodiment of this invention, two mixing geometries are connected in series to generate a controllable time-delay between the addition of various components. By introducing the amphiphilic stabilizer as a secondary step in the precipitation process, the precipitation and stabilizing steps of traditional FNP can be independently controlled. Varying this time delay allows for particles to precipitate before introduction of stabilizer—improving surface anchoring efficiency and allowing for higher loading while maintaining small NP size.

In some embodiments, the mixed solution is transported to a location where the second process solution is mixed via tubing, and at least one dimension of the tubing is used to create a controlled delay time between mixing. For example, as one of skill in the art would understand, based on the flow rates of the output of the first continuous mixing chamber, the diameter or length of the tube between the first and second continuous mixing chambers can be designed to create a specific delay between the mixing. For example, tubing can be used to connect the first mixing process to the second mixing process. For example, the tube can have an outer diameter of about 1.6 mm, or 3.2 mm, and/or an inner diameter of about 0.065 mm, 0.125 mm, 0.175 mm, 0.25 mm, 0.5 mm, 0.75 mm, 1.00 mm, 2.00 mm, or 3.00 mm and/or a length between 100 mm and 200 mm, 200 mm to 300 mm, 300 mm to 400 mm, 400 mm to 500 mm, 500 mm to 600 mm, 600 mm to 700 mm, 700 mm to 800 mm, 800 mm to 900 mm, or 1 m to 10 m and/or a liquid residence time between 10 ms to 50 ms, 30 ms to 50 ms, 30 ms to 100 ms, 100 ms to 1 min, or above 1 min.

In some embodiments, some mixing may occur within a confined impingement jet (CIJ) mixer or multi-inlet vortex mixers (MIVM). For example, the process stream can be continuously combined with the more polar solvent stream in a CIJ mixer or a MIVM.

In some embodiments, the continuous mixing may occur within multiple CIJ mixers in series, or CIJ mixers connected to other mixers, such as MIVM. In one example, connecting the outlet of a CIJ mixer with the inlet of another CIJ mixer provides a total of three inlet streams. In another example, connecting the outlet if a CIJ mixer to the inlet of a MIVM results in a total of five inlet streams. For both examples, equipment was fabricated to allow for simultaneous injection of all inlet streams.

The delay time between mixing geometries can be calculated by dividing the total fluid residence volume between the mixing devices ($V_{res}$) by the fluid flow rate (Q). For example, in a system where tubing of known inner diameter is used to connect two mixing devices and the volumetric fluid flow rate in between the mixing devices is determined to be about 2.3 ml/s, the following table can

| Length of Tubing | Type of Tubing | Residence Volume (uL) | Residence Time |
| --- | --- | --- | --- |
| 250 mm (9.84 in) | 0.03 ID | 114 | 50 ms |
| 500 mm (19.7 in) | 0.03 ID | 228 | 100 ms |
| 222 mm (8.74 in) | 0.055 ID | 342 | 150 ms |
| 296 mm (11.6 in) | 0.055 ID | 456 | | provide a guide for determining delay times.

The nanoparticles can be produced using two sequential confined, continuous, mixing chambers connected in series. In the first mixing chamber, the nanoparticle core material nucleates and forms the nanoparticle core. In the second mixing chamber, the stabilizing amphiphilic stabilizer is applied. In some embodiments, the delay time between the first and second mixing chamber is at least 5 ms, 10 ms, 50 ms, 100 ms, 900 ms, 1000 ms, 2000 ms, or 10,000 ms and the delay time between the first mixing chamber and the second mixing chamber is less than 1 minute, less than 0.5 minutes, less than 0.3 minutes, or less than 0.1 minute, and all combinations thereof. In some embodiments, the method the delay time is 5 ms to 1 min, and more preferably 10 ms to 0.1 min.

A second disclose method encapsulates a hydrophobic ion-pair agent in a nanoparticle. The nanoparticle is formed by dissolving a charged hydrophilic ion (such as small molecules, peptides, or proteins that contain one or more charged anionic or cationic group, including, e.g., oleic acid, polymyxin b, sodium dodecyl sulfate, cinnarizine, pamoic acid, and combinations thereof) in a polar solvent to form a primary process solution. A counterion (such as small molecules, lipids, surfactants, detergents, or polymers that contain one or more charged anionic or cationic group) can be dissolved in a polar or nonpolar solvent to form a secondary process solution. The primary process solution is combined with the secondary process solution to form a tertiary process solution. After a delay, the tertiary process solution is then introduced to an amphiphilic stabilizer to form nanoparticles.

Each or all of the streams can also contain salt and/or buffer to tune electrostatic interactions. For example, the more polar stream can contain sodium chloride, potassium chloride, phosphate buffers, acetate buffers, or combinations. Salt and/or buffer concentrations can range from 0 mM to 10 mM, 10 mM to 100 mM, or 100 mM to 1M.

Also disclosed is a device which can be used for the aforementioned processes. The device comprises a connection tube can be inserted between the outlet of one independent mixing chamber with an inlet of a second independent mixing chamber as described above. For example, the outlet of a CIJ mixer could be connected to an inlet of a MIVM. In another example, the outlet of a CIJ mixer could be connected to an inlet of another CIJ mixer. In another example, the outlet of a MIVM could be connected to an inlet of a CIJ mixer. In another example, the outlet of a MIVM could be connected to an inlet of another MIVM.

As described above, the connecting tube can introduce a delay (residence) time between the two mixing processes. For example, the tube can have an outer diameter of about 1.6 mm, or 3.2 mm, and/or an inner diameter of about 0.065 mm, 0.125 mm, 0.175 mm, 0.25 mm, 0.5 mm, 0.75 mm, 1.00 mm, 2.00 mm, or 3.00 mm and/or a length between 100 mm and 200 mm, 200 mm to 300 mm, 300 mm to 400 mm, 400 mm to 500 mm, 500 mm to 600 mm, 600 mm to 700 mm, 700 mm to 800 mm, 800 mm to 900 mm, or 1 m to 10 m and/or a liquid residence time between 10 ms to 50 ms, 30 ms to 50 ms, 30 ms to 100 ms, 100 ms to 1 min, or above 1 min.

This approach shares many of the same advantages of single step FNP, including being continuous and scalable. Pharmaceutical companies can, therefore, easily implement this technology to improve current nanoparticle-based formulations while reducing cost. Higher core loading would also enable new lower-potency drugs to be delivered in sufficient amounts via nanoparticle technology. Additionally, this disclosed approach may be deployed across a variety of fields and applications, including drug delivery, medical imaging, catalysis, and customer product development. For example, increased core loading can improve catalysis yield efficiency (See, Gole, B. et al. Inorg. Chem (2016) 55, 5, 2345-2354)

Example 1: High Loading Tocopheryl Acetate Nanoparticles Using Sequential FNP with Two Connected Confined Impingement Jet Mixers (CIJ-CIJ)

Tocopheryl acetate (herein, "VitEAc") is a model pharmaceutical compound with use in the cosmetic industry for skin creams. VitEAc was dissolved in tetrahydrofuran (THF) at 12.5 mg/mL. Polystyrene-b-poly(ethylene glycol) (PS-b-PEG) with 1.6 kDa polystyrene block and 5.0 kDa poly(ethylene glycol) block was dissolved in THF at 1.25 mg/mL and at 0.625 mg/mL. Polyetheretherketone (PEEK) tubing with ID=0.75 mm, OD=1.58 mm, and length=250 mm was used to connect the outlet of one CIJ to the inlet of another CIJ. The residence time between the two mixers was calculated based on fluid velocity to be about 50 ms (See definition for residence time). In the first CIJ mixer, 2 mL of the VitEAc solution in THF was rapidly mixed with a 2 mL of 0.1M NaCl solution in MilliQ water. After a residence delay in the connection tube, the resulting solution was mixed against 4 mL of PS-b-PEG in THF solution and quenched into a 42 mL reservoir of stirring 0.1M NaCl solution in MilliQ water. If a 1.25 mg/mL PS-b-PEG stream was used, the resulting nanoparticles are at 83.3% core loading. If a 0.625 mg/mL PS-b-PEG stream was used, the resulting nanoparticles are at 91.6% core loading. DLS measurement showed that the sequential FNP process was able to form nanoparticles at 83.3% core loading with sizes of around 61 nm and polydispersity index (PDI) of around 0.08. At 91.6% core loading of VitEAc, nanoparticles were formed with sizes around 81 nm and PDI of around 0.05. If no stabilizer was added in the second mixing step, large precipitates were formed rather than nanoparticles (FIG. 1).

Figure 2A:
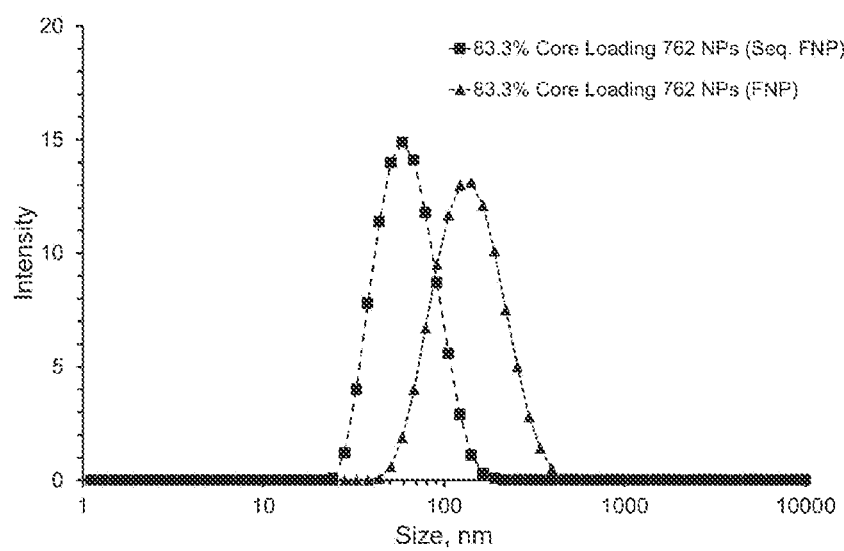
FIG. 2A. Graph of DLS signal, comparing PSD of 1,4, 8,11,15,18,22,25-Octabutoxy-29H,31H-phthalocyanine ("762Pc") core nanoparticles made with a sequential FNP system (CIJ-CIJ) to 762Pc nanoparticles made with traditional FNP at the same core loading (83.3%). The mean size of the particles as determined by DLS was as follows: [83.3% 762Pc NPs using sequential FNP]=50.23 nm; [83.3% 762Pc NPs using traditional FNP]=133.3 nm.
Figure 2B:
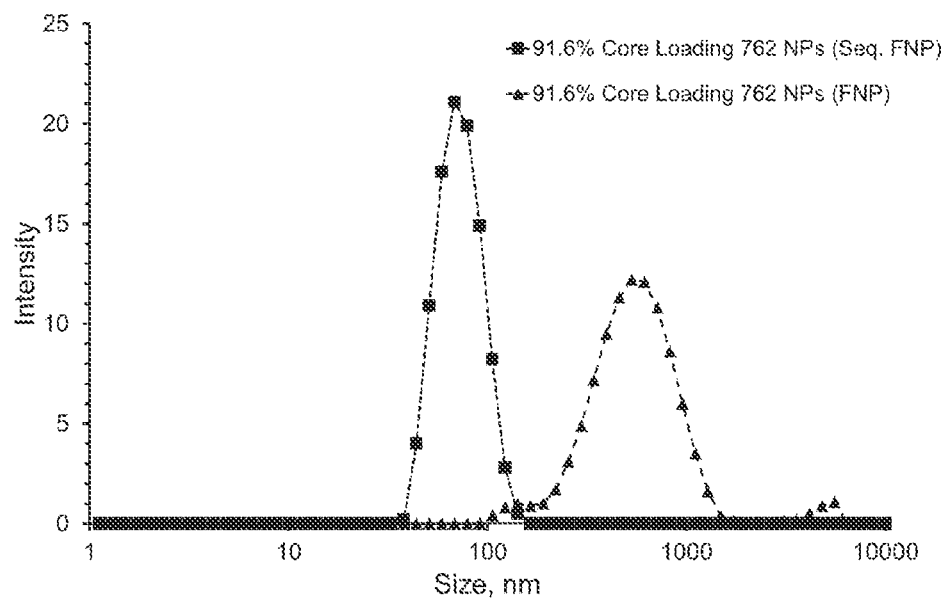
FIG. 2B. Graph of DLS signal, comparing PSD of 1,4,8, 11,15,18,22,25-Octabutoxy-29H,31H-phthalocyanine ("762Pc") core nanoparticles made with a sequential FNP system (CIJ-CIJ) to 762Pc nanoparticles made with traditional FNP at the same core loading (91.6%). The mean size of the particles as determined by DLS was as follows: [91.6% 762Pc NPs using sequential FNP]=69.71 nm; [91.6% 762Pc NPs using traditional FNP]=507.0 nm.

Example 2: High Loading 1,4,8,11,15,18,22,25-Octabutoxy-29H,31H-phthalocyanine Nanoparticles Using Sequential FNP (CIJ-CIJ) with Comparison to Traditional FNP Nanoparticles 1,4,8,11,15,18,22,25-Octabutoxy-29H,31H-phthalocyanine (herein, "762Pc") is a medical imaging contrast agent with demonstrated applications in positron emission tomography (PET) and photoacoustic imaging (PAD. 762Pc has a log P of about 10.49 and negligible water solubility. Polyetheretherketone (PEEK) tubing with ID=0.75 mm, OD=1.58 mm, and length=250 mm was used to connect the outlet of one CIJ to the inlet of another CIJ. The residence time between the two mixers was calculated based on fluid velocity to be about 50 ms. 762Pc was dissolved in tetrahydrofuran (THF) at 12.5 mg/mL. Polystyrene-b-poly(ethylene glycol) (PS-b-PEG) with 1.6 kDa polystyrene block and 5.0 kDa poly(ethylene glycol) block was dissolved in THF at 1.25 mg/mL and at 0.625 mg/mL. In the first CIJ mixer, 2 mL of the 762Pc solution in THF was rapidly mixed with a 2 mL of 0.1M NaCl solution in MilliQ water. After a residence delay in the connection tube, the resulting solution was mixed against 4 mL of PS-b-PEG in THF solution and quenched into a 42 mL reservoir of stirring 0.1M NaCl solution in MilliQ water. If 1.25 mg/mL PS-b-PEG was used, the resulting nanoparticles are at 83.3% core loading. If 0.625 mg/mL PS-b-PEG was used, the resulting nanoparticles are at 91.6% core loading. For comparison, 762Pc nanoparticles were fabricated using the traditional FNP method at 83.3% and 91.6% core loadings. Here, 762Pc and PS-b-PEG were dissolved in 0.5 mL THF and Flash NanoPrecipitated against 0.5 mL of 0.1M NaCl solution in MilliQ water into a 4 mL reservoir of stirring 0.1M NaCl solution in MilliQ water. The final concentrations of each system component in both processes (traditional FNP and sequential FNP) were kept constant. DLS measurement showed that the sequential FNP process was able to form nanoparticles at 83.3% (Size=50.23 nm, PDI=0.09) and 91.6% (Size=69.71 nm, PDI=0.05) core loading of 762Pc. Comparison with the traditional FNP method showed that nanoparticles made using sequential FNP were smaller and more monodisperse at 83.3% core loading (FIG. 2A) and at 91.6% core loading (FIG. 2B).

Example 3: High-Loading Polylactic Acid (PLA) Homopolymer Core with PLA-PEG Stabilizer Nanoparticles Using Sequential FNP (CIJ-CIJ)

Figure 3:
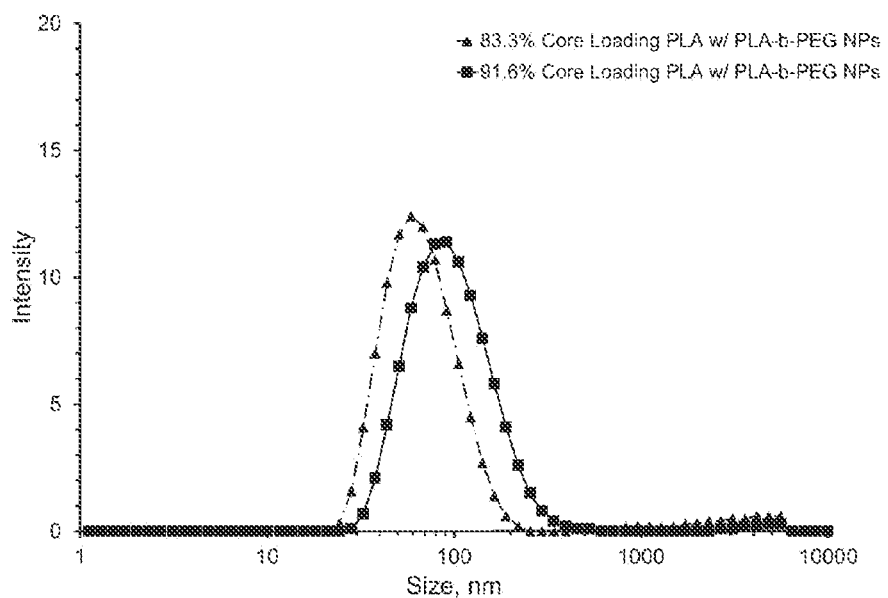
FIG. 3. Graph of DLS signal, indicating PSD of polylactic acid (PLA) homopolymer core with PLA-PEG stabilizer nanoparticles made with a sequential FNP system (CIJ-CIJ). The mean size of the particles as determined by DLS was as follows: [83.3% PLA NPs]=63.2 nm; [91.6% PLA NPs]=84.1 nm.

Poly (lactic acid) or PLA with a molecular weight of 5 kDa was dissolved in tetrahydrofuran (THF) at 12.5 mg/mL. Poly (lactic acid)-b-poly(ethylene glycol) (PLA-b-PEG) with 3.7 kDa polystyrene block and 5.0 kDa poly(ethylene glycol) block was dissolved in THF at 1.25 mg/mL and at 0.625 mg/mL. Polyetheretherketone (PEEK) tubing with ID=0.75 mm, OD=1.58 mm, and length=250 mm was used to connect the outlet of one CIJ mixer to the inlet of another CIJ mixer. The residence time between the two mixers was calculated based on fluid velocity to be about 50 ms. In the first CIJ mixer, 2 mL of the PLA solution in THF was rapidly mixed with a 2 mL of 0.1M NaCl solution in MilliQ water. After a residence delay in the connection tube, the resulting solution was mixed against 4 mL of PLA-b-PEG in THF solution and quenched into a 42 mL reservoir of stirring 0.1M NaCl solution in MilliQ water. If 1.25 mg/mL PLA-b-PEG was used, the resulting nanoparticles are at 83.3% core loading. If 0.625 mg/mL PLA-b-PEG was used, the resulting nanoparticles are at 91.6% core loading. DLS measurement showed that the sequential FNP process was able to form nanoparticles at 83.3% core loading of PLA with sizes of around 63 nm and polydispersity index (PDI) of around 0.23. At 91.6% core loading of PLA, nanoparticles were formed with sizes around 84 nm and PDI of around 0.20 (FIG. 3).

Example 4: High-Loading Polycaprolactone (PCL) Homopolymer Core with PCL-PEG Stabilizer Nanoparticles Using Sequential FNP (CIJ-CIJ)

Figure 4:
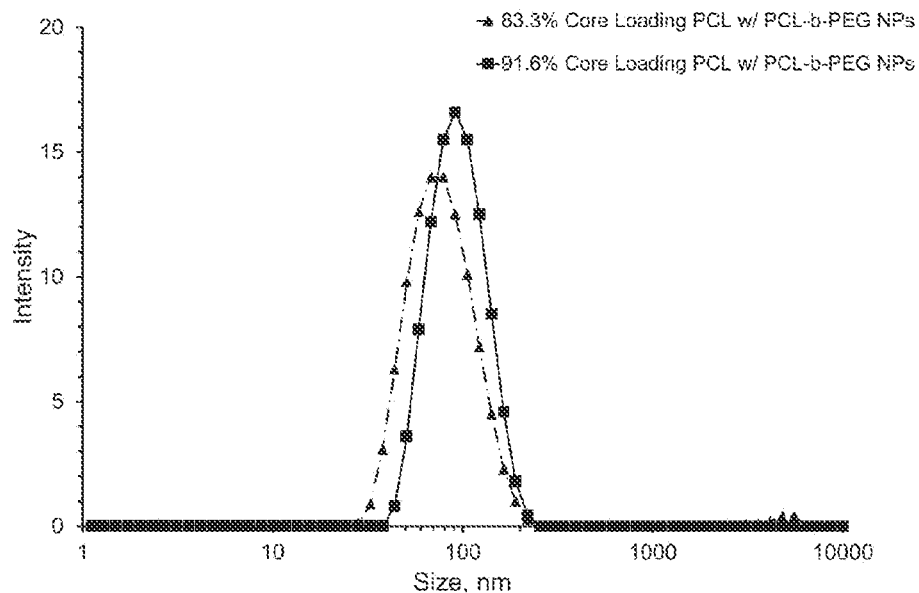
FIG. 4. Graph of DLS signal, indicating PSD of polylactic acid (PCL) homopolymer core with PCL-PEG stabilizer nanoparticles made with a sequential FNP system (CIJ-CIJ). The mean size of the particles as determined by DLS was as follows: [83.3% PCL NPs]=70.8 nm; [91.6% PCL NPs]=87.4 nm.

Polycaprolactone (PCL) with a molecular weight of 3.5 kDa was dissolved in tetrahydrofuran (THF) at 12.5 mg/mL. Polycaprolactone-b-poly(ethylene glycol) (PCL-b-PEG) with 5.0 kDa polystyrene block and 5.0 kDa poly(ethylene glycol) block was dissolved in THF at 1.25 mg/mL and at 0.625 mg/mL. Polyetheretherketone (PEEK) tubing with ID=0.75 mm, OD=1.58 mm, and length=250 mm was used to connect the outlet of one CIJ mixer to the inlet of another CIJ mixer. The residence time between the two mixers was calculated based on fluid velocity to be about 50 ms. In the first CIJ mixer, 2 mL of the PCL solution in THF was rapidly mixed with a 2 mL of 0.1M NaCl solution in MilliQ water. After a residence delay in the connection tube, the resulting solution was mixed against 4 mL of PCL-b-PEG in THF solution and quenched into a 42 mL reservoir of stirring 0.1M NaCl solution in MilliQ water. If 1.25 mg/mL PCL-b-PEG was used, the resulting nanoparticles are at 83.3% core loading. If 0.625 mg/mL PCL-b-PEG was used, the resulting nanoparticles are at 91.6% core loading. DLS measurement showed that the sequential FNP process was able to form nanoparticles at 83.3% core loading of PCL with sizes of around 71 nm and polydispersity index (PDI) of around 0.16. At 91.6% core loading of PCL, nanoparticles were formed with sizes around 87 nm and PDI of around 0.09 (FIG. 4).

Example 5: High-Loading Lumefantrine-Loaded HPMCAS Nanoparticles Using Sequential FNP (CIJ-CIJ)

Figure 5:
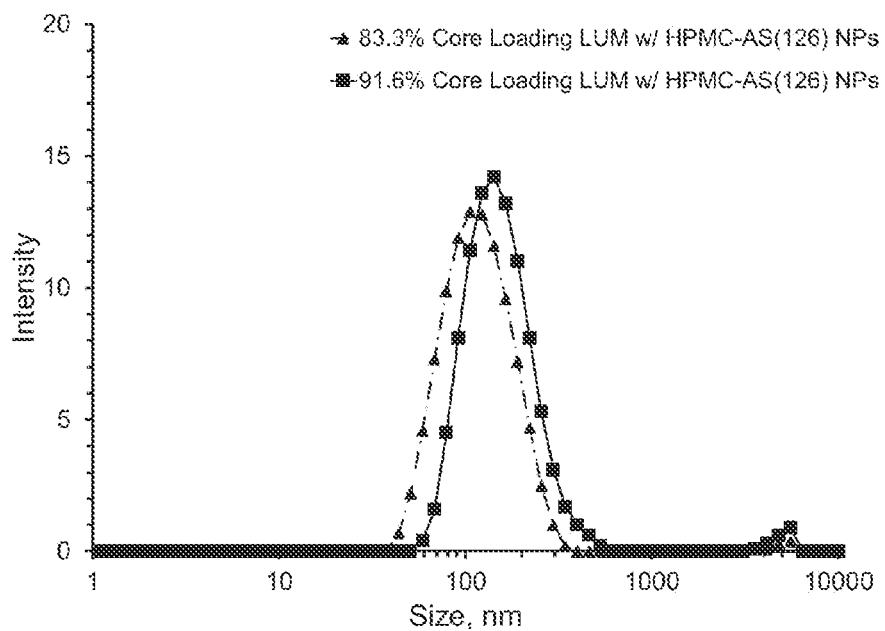
FIG. 5. Graph of DLS signal, indicating PSD of lumefantrine (LUM) core with AFFTNISOL™ Hypromellose acetate succinate (HPMCAS) stabilizer nanoparticles made with a sequential FNP system (CIJ-CIJ). The mean size of the particles as determined by DLS was as follows: [83.3% LUM NPs]=106.2 nm; [91.6% LUM NPs]=146.3 nm.

HPMCAS is a cellulosic polymer of a cellulose ester bearing acetyl and succinyl groups. It is synthesized by the esterification of HPMC (hydroxypropylmethyl cellulose) with acetic anhydride and succinic anhydride, which offers flexibility in acetate and succinate substitution levels, and which allows for optimization of both solubility enhancement and material processing. HPMCAS has been used to maintain stable solid dispersions and inhibit drug crystallization through spray-dried dispersion or hot-melt extrusion. AFFTNISOL™ Hypromellose acetate succinate (HPMCAS) 126, 716, 912 polymers were donated from Dow Chemical Company (Midland, MI). HPMCAS 126 has the highest acetyl substitution and is the most hydrophobic. HPMCAS 126 can have a hydroxypropyl substitution of from about 6 to about 10%, a methoxyl substitution of from 22 to 26%, an acetate (acetyl) substitution of from about 10 to about 14%, and a succinate (succinyl) substitution of from about 4 to about 8%. Lumefantrine (LUM) was dissolved in tetrahydrofuran (THF) at 12.5 mg/mL. HPMCAS (126) was dissolved in THF at 1.25 mg/mL and at 0.625 mg/mL. Polyetheretherketone (PEEK) tubing with ID=0.75 mm, OD=1.58 mm, and length=250 mm was used to connect the outlet of one CIJ mixer to the inlet of another CIJ mixer. The residence time between the two mixers was calculated based on fluid velocity to be about 50 ms. In the first CIJ mixer, 2 mL of the LUM solution in THF was rapidly mixed with a 2 mL of 0.1× phosphate buffered saline (PBS) solution. After the residence delay of about 50 ms in the connection tube, the resulting solution was mixed against 4 mL of HPMCAS (126) in THF solution and quenched into a 42 mL reservoir of stirring solution of MilliQ water. If 1.25 mg/mL HPMCAS(126) was used, the resulting nanoparticles are at 83.3% core loading. If 0.625 mg/mL HPMCAS(126) was used, the resulting nanoparticles are at 91.6% core loading. DLS measurement showed that the sequential FNP process was able to form nanoparticles at 83.3% core loading of LUM with sizes of around 106 nm and polydispersity index (PDI) of around 0.18. At 91.6% core loading of LUM, nanoparticles were formed with sizes around 146 nm and PDI of around 0.20 (FIG. 5). Using pure MilliQ water or a 0.1M sodium chloride solution as the antisolvent in the first CIJ mixer resulted in aggregation and no nanoparticle formation. Hence, the sequential FNP technology can be adapted for use with cellulose-based random copolymer stabilizers.

Example 6: High Loading Tocopheryl Acetate Nanoparticles Using Sequential FNP with One Confined Impingement Jet Mixer Connected to a Multi-Inlet Vortex Mixer (CIJ-MIVM)

Figure 6:
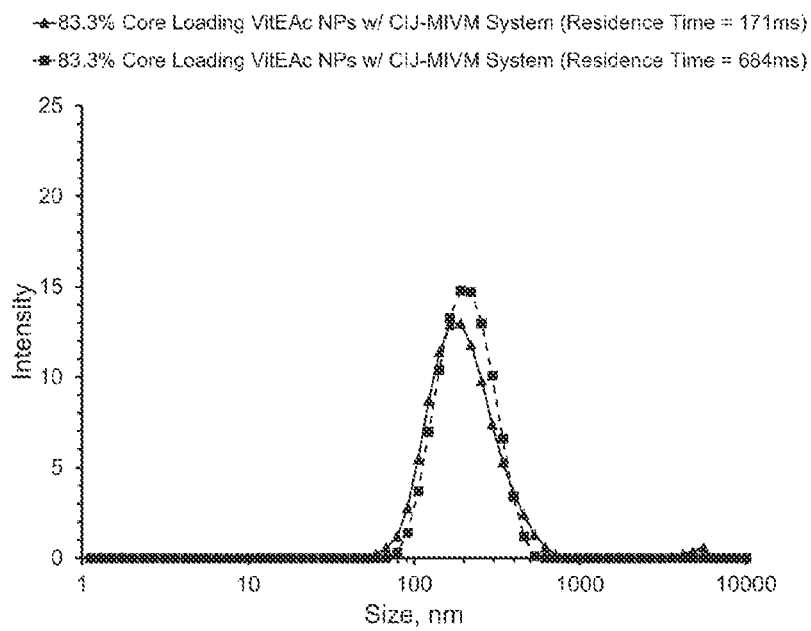
FIG. 6. Graph of DLS signal, indicating PSD of VitEAc core NPs with PS-PEG stabilizer made with a sequential FNP system with a confined impingement mixer (CIJ) followed by a multi-inlet vortex mixer (MIVM) with varying residence times. The mean size of the particles as determined by DLS was as follows: [83.3% VitEAc NPs (Residence Time–171 ms)]=180.8 nm; [83.3% VitEAc NPs (Residence Time–684 ms)]=188.7 nm.

Tocopheryl acetate (herein, "VitEAc") is a model pharmaceutical compound with use in the cosmetic industry for skin creams. Polyetheretherketone (PEEK) tubing with ID=0.75 mm, OD=1.58 mm, and length=210 mm or 840 mm was used to connect the outlet of one CIJ to the inlet of a multi-inlet vortex mixer (MIVM). The residence time between the two mixers was calculated based on fluid velocity to be about 171 ms for a tube length of 210 mm or about 684 ms for a tube length of 840 nm. VitEAc was dissolved in tetrahydrofuran (THF) at 12.5 mg/mL. Polystyrene-b-poly(ethylene glycol) (PS-b-PEG) with 1.6 kDa polystyrene block and 5.0 kDa poly(ethylene glycol) block was dissolved in THF at 1.25 mg/mL. In the first (CM) mixer, 2 mL of the VitEAc solution in THF was rapidly mixed with a 2 mL of 0.1M NaCl solution in MilliQ water. After a residence delay of either about 171 ms or about 684 ms in the connection tube, the resulting solution was then fed into one of the inlets of the MIVM. The resulting solution was mixed against three other inlet streams of the following composition. (Stream 1) 4 mL of the aforenoted PS-b-PEG in THF solution at 1.25 mg/mL. (Streams 2 and 3) 4 mL of 0.1M NaCl solution in MilliQ water. The resulting nanoparticles are at 83.3% core loading. For a residence delay time of about 171 ms, DLS measurement showed that the sequential FNP process (CIJ-MIVM) was able to form VitEAc nanoparticles at 83.3% core loading with an average NP size of 180.8 nm and polydispersity index (PDI) of around 0.19 (FIG. 6). For a residence delay time of about 684 ms, nanoparticles at 83.3% core loading were formed with an average NP size of 188.7 nm and polydispersity index (PDI) of around 0.18 (FIG. 6). Thus, increasing residence time by 4-fold resulted in a less than 5% difference in nanoparticle size. Hence, the sequential FNP system (CIJ-MIVM) is robust against minor variations in residence at short (<1 s) timescales.

Figure 7:
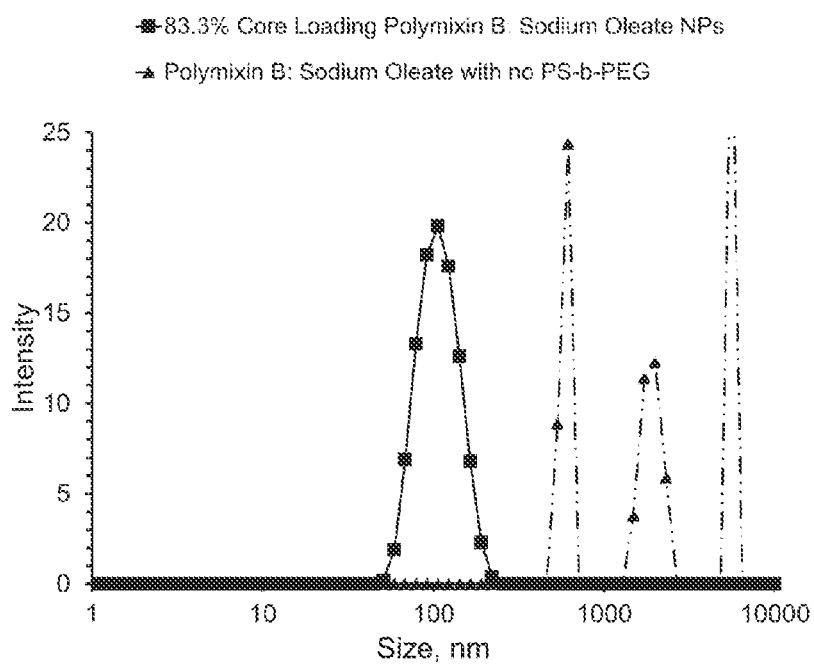
FIG. 7. Graph of DLS signal, indicating PSD of an ion paired system of polymyxin B and sodium oleate core made with a sequential FNP system (CIJ-CIJ). If no PS-b-PEG stabilizer was added, the DLS measurement indicated aggregation and no nanoparticle formation. The mean size of the particles as determined by DLS was as follows: [83.3% polymyxin B:sodium oleate NPs]=102.2 nm; [polymyxin B:sodium oleate no stabilizer]=5964 nm.

Example 7: High-Loading Polymyxin B-Loaded Nanoparticles Using Sequential FNP (CIJ-CIJ) and Hydrophobic Ion-Pairing Polymyxin B is an antibiotic used to treat bacterial infections including but not limited to meningitis, blood infections, and eye infections. Polymyxin B was previously reported to be encapsulated into nanoparticles by FNP through the formation of a hydrophobic ion paired complex made by allowing anionic oleate ions to electrostatically interact with cationic polymyxin B in a CIJ mixer or prior to CIJ mixing. The resulting complex precipitated in the presence of water. We here followed the same procedure to ion pair and encapsulate polymyxin B into a highly loaded nanoparticle. Polymyxin B was dissolved in MilliQ water at 14.625 mg/mL. Sodium oleate was dissolved in methanol at 12.5 mg/mL. Polystyrene-b-poly(ethylene glycol) (PS-b-PEG) with 1.6 kDa polystyrene block and 5.0 kDa poly(ethylene glycol) block was dissolved in THF at 2.5 mg/mL. Polyetheretherketone (PEEK) tubing with ID=0.75 mm, OD=1.58 mm, and length=250 mm was used to connect the outlet of one CIJ to the inlet of another CIJ. The residence time between the two mixers was calculated based on fluid velocity to be about 50 ms. In the first CIJ mixer, 2 mL of the Polymyxin B solution in MilliQ water was rapidly mixed with a 2 mL of the sodium oleate solution in methanol. After a residence delay in the connection tube, the resulting solution was mixed against 4 mL of PS-b-PEG in THF solution and quenched into a 42 mL reservoir of stirring 0.1M NaCl solution in MilliQ water. The resulting nanoparticles are at 83.3% core loading. DLS measurement showed that the sequential FNP process was able to form nanoparticles at 83.3% core loading with sizes of around 102 nm and polydispersity index (PDI) of around 0.06. If no stabilizer was added in the second mixing step, no nanoparticles were formed (FIG. 7).

Figure 8:
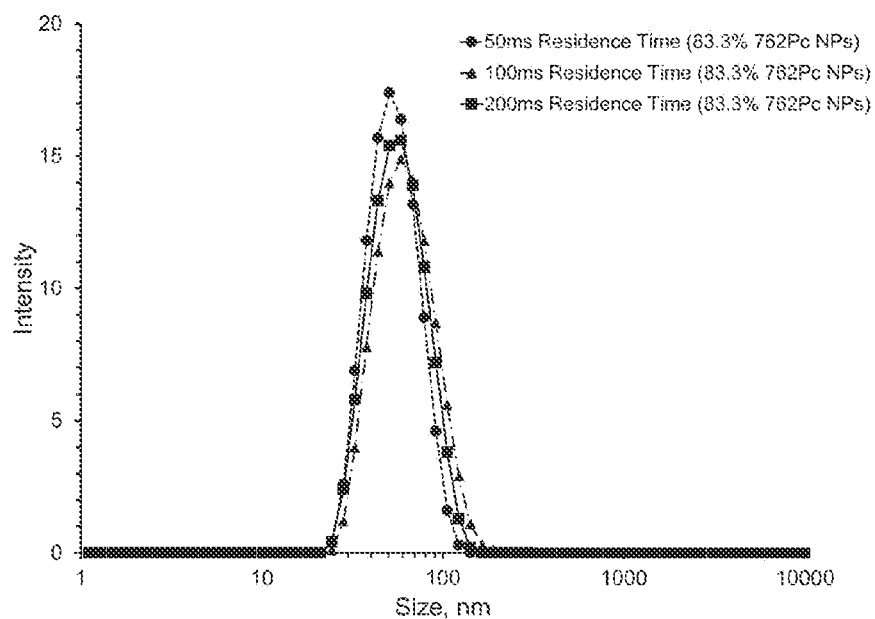
FIG. 8. Graph of DLS signal, indicating PSD of 762Pc core NPs with PS-PEG stabilizer made with a sequential FNP system (CIJ-CIJ) with varying residence times. The mean size of the particles as determined by DLS was as follows: [83.3% 762Pc NPs (Residence Time-50 ms)]=50.23 nm; [83.3% 762Pc NPs (Residence Time-100 ms)]=57.8 nm; [83.3% 762Pc NPs (Residence Time-200 ms)]=53.4 nm.

Example 8: Effect of Short Residence Times on Nanoparticle Formation for CIJ-CIJ System 762Pc was dissolved in tetrahydrofuran (THF) at 12.5 mg/mL. Polystyrene-b-poly(ethylene glycol) (PS-b-PEG) with 1.6 kDa polystyrene block and 5.0 kDa poly(ethylene glycol) block was dissolved in THF at 1.25 mg/mL. Polyetheretherketone (PEEK) tubing was used to connect the outlet of one CIJ to the inlet of another CIJ. Tubing length was varied to generate residence times of about 50 ms, 100 ms, and 150 ms between the two mixing chambers. In the first CIJ mixer, 2 mL of the 762Pc solution in THF was rapidly mixed with a 2 mL of 0.1M NaCl solution in MilliQ water. After a residence delay in the connection tube, the resulting solution was mixed against 4 mL of PS-b-PEG in THF solution and quenched into a 42 mL reservoir of stirring 0.1M NaCl solution in MilliQ water. DLS measurement shows little to no dependence of particle size on residence time (FIG. 8). The shortest residence time (50 ms) yielded particles around 50.2 nm diameter (PDI=0.05), where the longest residence time (150 nm) produced particles of about 53.4 nm (PDI=0.10). Hence, the sequential FNP system is robust against minor variations in residence at short (<1 s) timescales.

Example 9: Effect of Long Residence Times on Nanoparticle Formation for CIJ-CIJ System 762Pc and PS (1.6 k)-b-PEG (5 k) were dissolved in THF at 10 mg/mL and 1 mg/mL, respectively. Using a CIJ mixer, 0.5 mL of the 762Pc in THF solution was mixed against 0.5 mL of 0.1M NaCl solution in MilliQ water into an empty collection vessel. After 1 min or 2 min of waiting time, 0.5 mL of the resulting solution was mixed against 0.5 mL of the PS-b-PEG in THF solution and quenched into a 4 mL reservoir of stirring 0.1M NaCl solution in MilliQ water.

Figure 9:
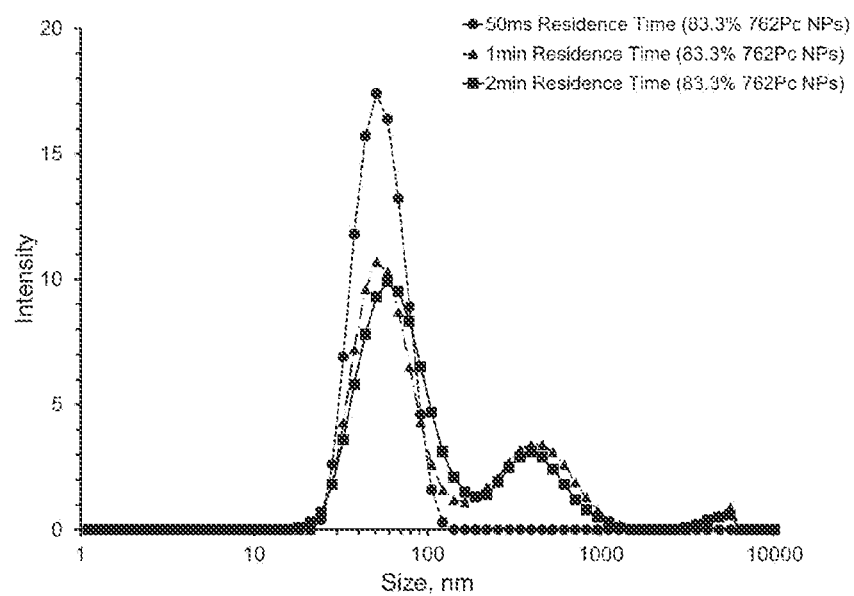
FIG. 9. Graph of DLS signal, comparing PSD of 762Pc core NPs made with 50 ms delay time to 762Pc core NPs made with longer delay times. The mean size of the particles as determined by DLS was as follows: [83.3% 762Pc NPs (Residence Time-50 ms)]=50.23 nm; [83.3% 762Pc NPs (Residence Time-1 min)]=75.73 nm; [83.3% 762Pc NPs (Residence Time-2 min)]=80.4 nm.

DLS traces from the resulting formulations were graphed alongside formulations with millisecond residence times for comparison (FIG. 9). Nanoparticle formulations with 50 ms residence time had significantly smaller diameters (50.2 nm) and PDI (0.05) compared to nanoparticles with 1 min residence time (diameter=75 nm, PDI=0.41) and 2 min residence time (diameter=80.4 nm, PDI=0.40). One known limitation of these DLS traces is that this measurement fails to capture particles at sizes larger than 10 um due to beam width and sedimentation limitations. However, for both long delay time formulations (1 min and 2 min), significant aggregation could be detected visually through observation of the sample vials. Hence, the sequential FNP process with controlled but fast residence times is required to generate small and monodisperse nanoparticles.

Figure 10:
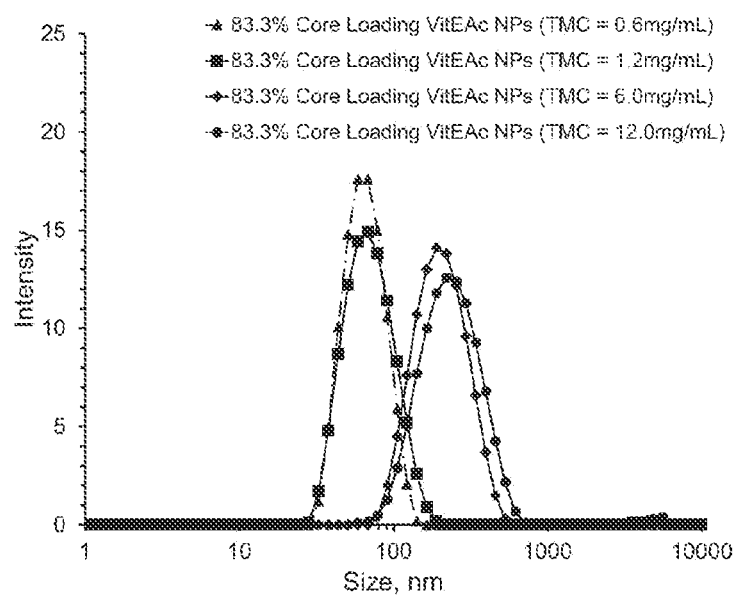
FIG. 10. Graph of DLS signal, indicating PSD of 83.3% loading VitEAc core NPs with PS-PEG stabilizer made with a sequential FNP system (CIJ-CIJ) at varying total mass concentrations (TMC). The mean size of the particles as determined by DLS was as follows: [83.3% VitEAc NPs (TMC=0.6 mg/mL)]=61.49 nm; [83.3% VitEAc NPs (TMC=1.2 mg/mL)]=65.86 nm; [83.3% VitEAc NPs (TMC=6.0 mg/mL)]=186.5 nm; [83.3% VitEAc NPs (TMC=12.0 mg/mL)]=216.9 nm.

Example 10: Increasing Total Mass Concentration for 83.3% Core Loading Tocopheryl Acetate Nanoparticles The total mass concentration can be defined as the total mass concentration of nanoparticles in the final solution. This is a sum of the mass of the core material and the mass of the stabilizer in the system divided by the final solution volume. VitEAc was dissolved in tetrahydrofuran (THF) at 12.5 mg/mL, 25 mg/mL, 125 mg/ml, and at 250 mg/mL. Polystyrene-b-poly(ethylene glycol) (PS-b-PEG) with 1.6 kDa polystyrene block and 5.0 kDa poly(ethylene glycol) block was dissolved in THF at 1.25 mg/mL, 2.5 mg/mL, 12.5 mg/mL, 25 mg/mL. PEEK tubing with ID=0.75 mm, OD=1.58 mm, and length=250 mm was used to connect the outlet of one CIJ to the inlet of another CIJ. The residence time between the two mixers was calculated based on fluid velocity to be about 50 ms. In the first CIJ mixer, 2 mL of the VitEAc solution in THF was rapidly mixed with a 2 mL of 0.1M NaCl solution in MilliQ water. After a residence delay in the connection tube, the resulting solution was mixed against 4 mL of PS-b-PEG in THF solution and quenched into a 42 mL reservoir of stirring 0.1M NaCl solution in MilliQ water. If 12.5 mg/mL VitEAc and 1.25 mg/mL PS-b-PEG solutions were used, the resulting total mass concentration (TMC) would be 0.6 mg/mL. If 25 mg/mL VitEAc and 2.5 mg/mL PS-b-PEG solutions were used, the resulting total mass concentration (TMC) would be 1.2 mg/mL. If 125 mg/mL VitEAc and 12.5 mg/mL PS-b-PEG solutions were used, the resulting total mass concentration (TMC) would be 6 mg/mL. If 250 mg/mL VitEAc and 25 mg/mL PS-b-PEG solutions were used, the resulting total mass concentration (TMC) would be 12 mg/mL. DLS measurement showed that the sequential FNP process was able to form nanoparticles at 0.6 mg/mL, 1.2 mg/mL, 6.0 mg/mL and 12.0 mg/mL total mass concentrations (FIG. 10). Nanoparticle size increased with higher TMC with 0.6 mg/mL TMC NPs having diameters of 65 nm while 12.0 mg/mL NPs having diameters of 216 nm. The polydispersity index (PDI) increased slightly for higher TMC NPs but all formulations were relatively monodisperse with PDI<0.20.

Figure 11:
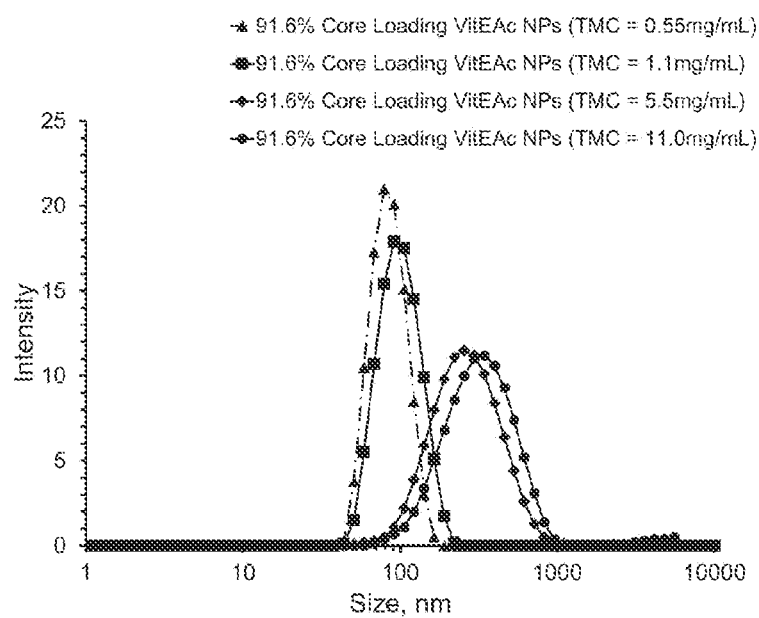
FIG. 11. Graph of DLS signal, indicating PSD of 91.6% loading VitEAc core NPs with PS-PEG stabilizer made with a sequential FNP system (CIJ-CIJ) at varying total mass concentrations (TMC). The mean size of the particles as determined by DLS was as follows: [91.6% VitEAc NPs (TMC=0.55 mg/mL)]=81.05 nm; [91.6% VitEAc NPs (TMC=1.1 mg/mL)]=93.72 nm; [91.6% VitEAc NPs (TMC=5.5 mg/mL)]=231.6 nm; [91.6% VitEAc NPs (TMC=11.0 mg/mL)]=288.6 nm.

Example 11: Increasing Total Mass Concentration for 91.6% Core Loading Tocopheryl Acetate Nanoparticles VitEAc was dissolved in tetrahydrofuran (THF) at 12.5 mg/mL, 25 mg/mL, 125 mg/ml, and at 250 mg/mL. Polystyrene-b-poly(ethylene glycol) (PS-b-PEG) with 1.6 kDa polystyrene block and 5.0 kDa poly(ethylene glycol) block was dissolved in THF at 0.625 mg/mL, 1.25 mg/mL, 6.25 mg/mL and 12.5 mg/mL. PEEK tubing with ID=0.75 mm, OD=1.58 mm, and length=250 mm was used to connect the outlet of one CIJ to the inlet of another CIJ. The residence time between the two mixers was calculated based on fluid velocity to be about 50 ms. In the first CIJ mixer, 2 mL of the VitEAc solution in THF was rapidly mixed with a 2 mL of 0.1M NaCl solution in MilliQ water. After a residence delay in the connection tube, the resulting solution was mixed against 4 mL of PS-b-PEG in THF solution and quenched into a 42 mL reservoir of stirring 0.1M NaCl solution in MilliQ water. If 12.5 mg/mL VitEAc and 0.625 mg/mL PS-b-PEG solutions were used, the resulting total mass concentration (TMC) would be 0.55 mg/mL. If 25 mg/mL VitEAc and 1.25 mg/mL PS-b-PEG solutions were used, the resulting total mass concentration (TMC) would be 1.1 mg/mL. If 125 mg/mL VitEAc and 6.25 mg/mL PS-b-PEG solutions were used, the resulting total mass concentration (TMC) would be 5.5 mg/mL. If 250 mg/mL VitEAc and 12.5 mg/mL PS-b-PEG solutions were used, the resulting total mass concentration (TMC) would be 11 mg/mL. DLS measurement showed that the sequential FNP process was able to form nanoparticles at 0.55 mg/mL, 1.1 mg/mL, 5.5 mg/mL and 11.0 mg/mL total mass concentrations (FIG. 11). Nanoparticle size increased with higher TMC with 0.55 mg/mL TMC NPs having diameters of 83 nm while 11.0 mg/mL NPs having diameters of 289 nm. Polydispersity index (PDI) increased slightly for higher TMC NPs but all formulations were relatively monodisperse with PDI<0.20.

Figure 12:
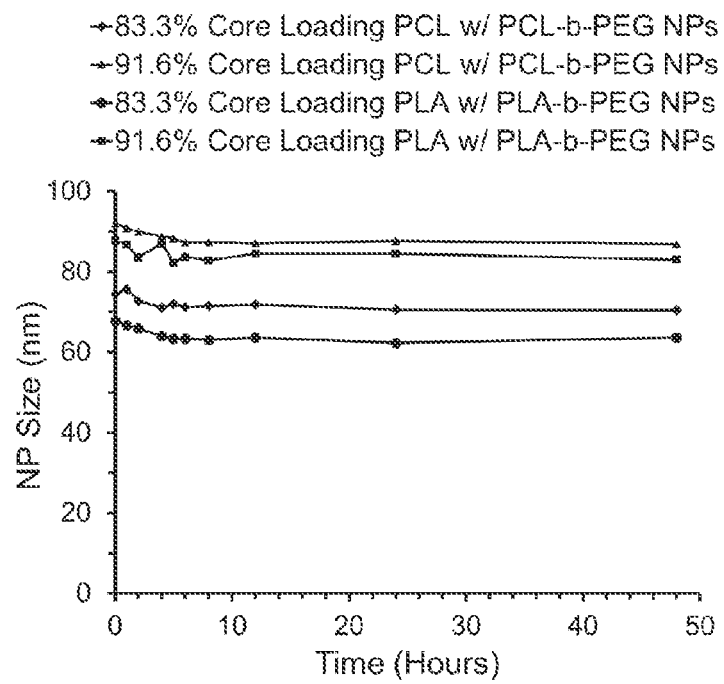
FIG. 12. Graph showing size stability of PLA and PCL core nanoparticles made with a sequential FNP system (CIJ-CIJ) over 48 hrs.

Example 12: Stability of Polycaprolactone Homopolymer Core with PCL-PEG Stabilizer Nanoparticles and Polylactic Acid Homopolymer Core with PLA-PEG Stabilizer Nanoparticles Poly (lactic acid) or PLA with a molecular weight of 5 kDa was dissolved in tetrahydrofuran (THF) at 12.5 mg/mL. Poly (lactic acid)-b-poly(ethylene glycol) (PLA-b-PEG) with 3.7 kDa polystyrene block and 5.0 kDa poly(ethylene glycol) block was dissolved in THF at 1.25 mg/mL and at 0.625 mg/mL. Polyetheretherketone (PEEK) tubing with ID=0.75 mm, OD=1.58 mm, and length=250 mm was used to connect the outlet of one CIJ mixer to the inlet of another CIJ mixer. The residence time between the two mixers was calculated based on fluid velocity to be about 50 ms. In the first CIJ mixer, 2 mL of the PLA solution in THF was rapidly mixed with a 2 mL of 0.1M NaCl solution in MilliQ water. After a residence delay in the connection tube, the resulting solution was mixed against 4 mL of PLA-b-PEG in THF solution and quenched into a 42 mL reservoir of stirring 0.1M NaCl solution in MilliQ water. If 1.25 mg/mL PLA-b-PEG was used, the resulting nanoparticles are at 83.3% core loading. If 0.625 mg/mL PLA-b-PEG was used, the resulting nanoparticles are at 91.6% core loading. Polycaprolactone (PCL) with a molecular weight of 3.5 kDa was dissolved in tetrahydrofuran (THF) at 12.5 mg/mL. Polycaprolactone-b-poly(ethylene glycol) (PCL-b-PEG) with 5.0 kDa polystyrene block and 5.0 kDa poly(ethylene glycol) block was dissolved in THF at 2.5 mg/mL and at 1.25 mg/mL. Polyetheretherketone (PEEK) tubing with ID=0.75 mm, OD=1.58 mm, and length=250 mm was used to connect the outlet of one CIJ mixer to the inlet of another CIJ mixer. The residence time between the two mixers was calculated based on fluid velocity to be about 50 ms. In the first CIJ mixer, 2 mL of the PCL solution in THF was rapidly mixed with a 2 mL of 0.1M NaCl solution in MilliQ water. After a residence delay in the connection tube, the resulting solution was mixed against 4 mL of PCL-b-PEG in THF solution and quenched into a 42 mL reservoir of stirring 0.1M NaCl solution in MilliQ water. If 2.5 mg/mL PCL-b-PEG was used, the resulting nanoparticles are at 83.3% core loading. If 1.25 mg/mL PCL-b-PEG was used, the resulting nanoparticles are at 91.6% core loading. All nanoparticle formulations were then incubated for 48 hours at room temperature in 10% THF and 90% MilliQ Water. DLS measurements were taken at 0, 1, 2, 4, 5, 6, 8, 12, and 24 hours following nanoparticle formation (FIG. 12). Nanoparticle sizes are shown to remain stable with <7% change in NP size for all formulations.

Figure 13A:
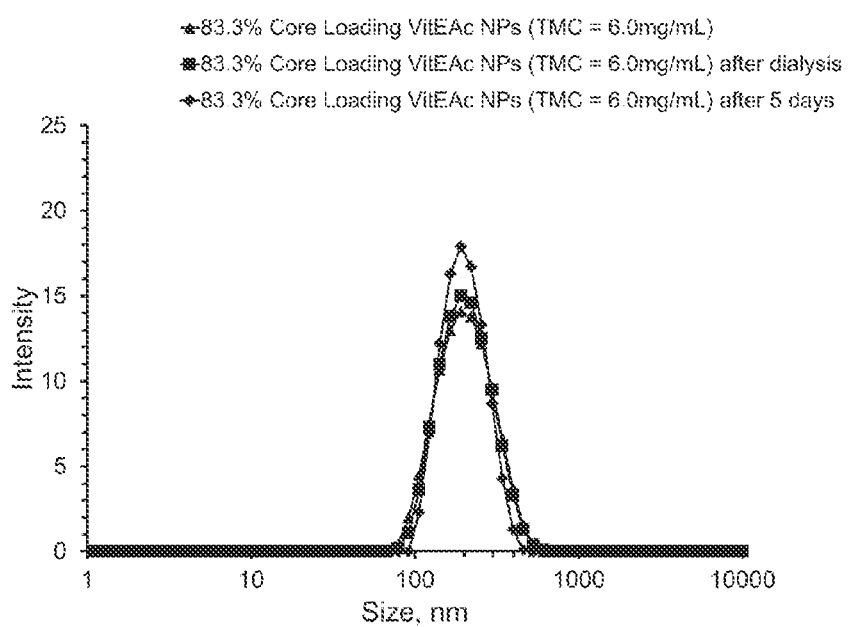
FIG. 13A. Graph of DLS signal, indicating PSD stability of 83.3% loading VitEAc core NPs with TMC=6.0 mg/mL after dialysis and after 5 days of incubation at room temperature. The mean size of the particles as determined by DLS was as follows: [83.3% VitEAc NPs (TMC=6.0 mg/mL)]=186.5 nm; [[83.3% VitEAc NPs (TMC=6.0 mg/mL) after dialysis]=189.7 nm; [83.3% VitEAc NPs (TMC=6.0 mg/mL) after 5 days]=193.5 nm.
Figure 13B:
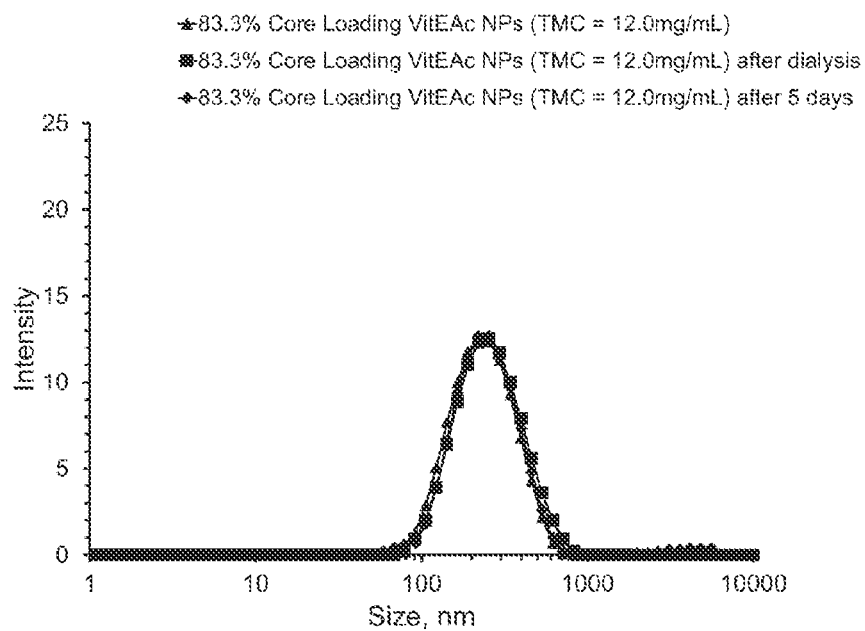
FIG. 13B. Graph of DLS signal, indicating PSD stability of 83.3% loading VitEAc core NPs with TMC=12.0 mg/mL after dialysis and after 5 days of incubation at room temperature. The mean size of the particles as determined by DLS was as follows: [83.3% VitEAc NPs (TMC=12.0 mg/mL)]=216.9 nm; [[83.3% VitEAc NPs (TMC=12.0 mg/mL) after dialysis]=227.3 nm; [83.3% VitEAc NPs (TMC=12.0 mg/mL) after 5 days]=232.4 nm.

Example 13: Stability of High Total Mass Concentration and High Core Loading Tocopheryl Acetate Nanoparticles Tocopheryl acetate (VitEAc) was dissolved in tetrahydrofuran (THF) at 125 mg/ml and at 250 mg/mL. Polystyrene-b-poly(ethylene glycol) (PS-b-PEG) with 1.6 kDa polystyrene block and 5.0 kDa poly(ethylene glycol) block was dissolved in THF at 12.5 mg/mL and at 25 mg/mL. PEEK tubing with ID=0.75 mm, OD=1.58 mm, and length=250 mm was used to connect the outlet of one CIJ to the inlet of another CIJ. The residence time between the two mixers was calculated based on fluid velocity to be about 50 ms. In the first CIJ mixer, 2 mL of the VitEAc solution in THF was rapidly mixed with a 2 mL of 0.1M NaCl solution in MilliQ water. After a residence delay in the connection tube, the resulting solution was mixed against 4 mL of PS-b-PEG in THF solution and quenched into a 42 mL reservoir of stirring 0.1M NaCl solution in MilliQ water. If 125 mg/mL VitEAc and 12.5 mg/mL PS-b-PEG solutions were used, the resulting total mass concentration (TMC) would be 6 mg/mL. If 250 mg/mL VitEAc and 25 mg/mL PS-b-PEG solutions were used, the resulting total mass concentration (TMC) would be 12 mg/mL. The core loading for both of these formulations is 83.3%. Nanoparticles were dialyzed against MilliQ water through a 3.5 kDa Spectra/Por 3 dialysis membrane for 48 hours. DLS measurements were conducted before/after dialysis and after 5 days of incubation at room temperature following dialysis (FIG. 13. A and B.). For both formulations (TMC=6.0 mg/mL and 12.0 mg/mL), nanoparticle size remained essentially constant (<10% size change) before and after dialysis. After 5 days, both formulations had <3% size change compared to the original formulation. Hence, even at high loading and at high TMC, VitEAc nanoparticle formulations remain stable for days stored at room temperature without any signs of aggregation.

Figure 14:
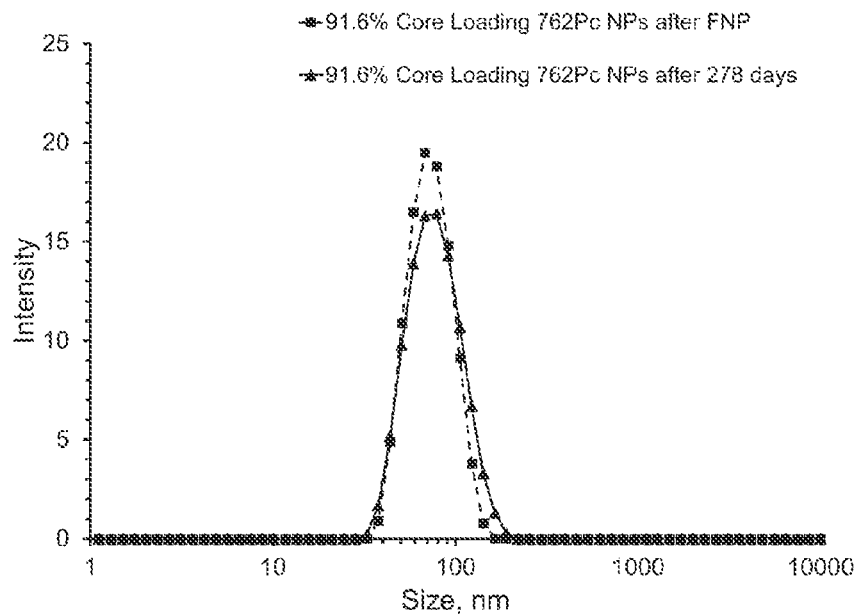
FIG. 14. Graph of DLS signal, indicating PSD stability of 91.6% loading 762Pc nanoparticles made with a sequential FNP system (CIJ-CIJ) over a period of about 9 months. The mean size of the particles as determined by DLS was as follows: [91.6% 762Pc NPs after FNP]=69.71 nm; [91.6% 762Pc NPs after 278 days]=72.14 nm.

Example 14: Long Time Stability of High Loading 1,4,8,11,15,18,22,25-Octabutoxy-29H,31H-phthalocyanine Nanoparticles 1,4,8,11,15,18,22,25-Octabutoxy-29H,31H-phthalocyanine (herein, "762Pc") was dissolved in tetrahydrofuran (THF) at 12.5 mg/mL. Polystyrene-b-poly(ethylene glycol) (PS-b-PEG) with 1.6 kDa polystyrene block and 5.0 kDa poly(ethylene glycol) block was dissolved in THF at 0.625 mg/mL. Polyetheretherketone (PEEK) tubing with ID=0.75 mm, OD=1.58 mm, and length=250 mm was used to connect the outlet of one CIJ to the inlet of another CIJ. The residence time between the two mixers was calculated based on fluid velocity to be about 50 ms. In the first CIJ mixer, 2 mL of the 762Pc solution in THF was rapidly mixed with a 2 mL of 0.1M NaCl solution in MilliQ water. After a residence delay in the connection tube, the resulting solution was mixed against 4 mL of PS-b-PEG in THF solution and quenched into a 42 mL reservoir of stirring 0.1M NaCl solution in MilliQ water. The resulting nanoparticles have a calculated 91.6% core loading. Nanoparticles were then incubated at room temperature in a 10% THF solution for approximately 9 months (278 days). DLS measurements were taken after NP formation and after incubation (FIG. 14). Although the NPs exhibited a slight increase in PDI (from 0.05 to 0.08) after 9 months incubation, the nanoparticles remained stable with <4% change in nanoparticle size. There were no visual signs of aggregation. Hence, these high loading nanoparticles are stable for long periods in 10% THF/Water solution without the need for further processing through lyophilization or spray drying.

Figure 15A:
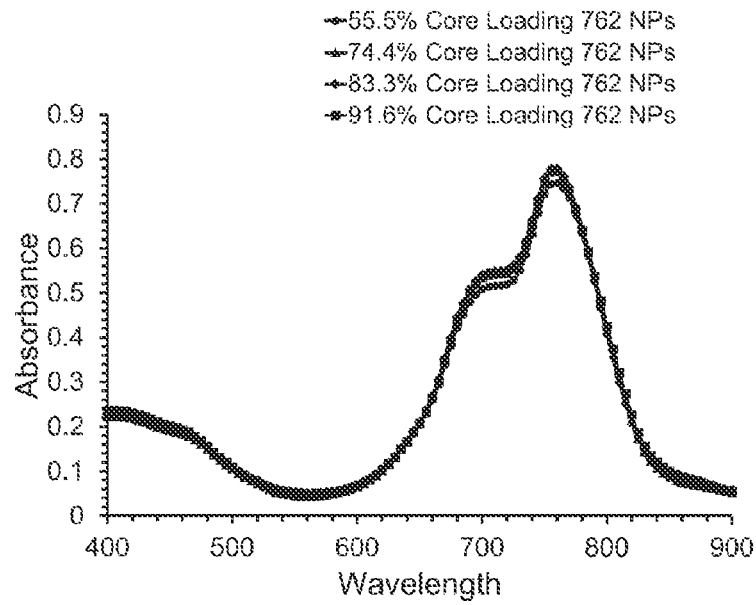
FIG. 15A. Graph of UV-VIS spectra, indicating absorbance of 762Pc nanoparticles made with a sequential FNP system (CIJ-CIJ) at various core loadings.
Figure 15B:
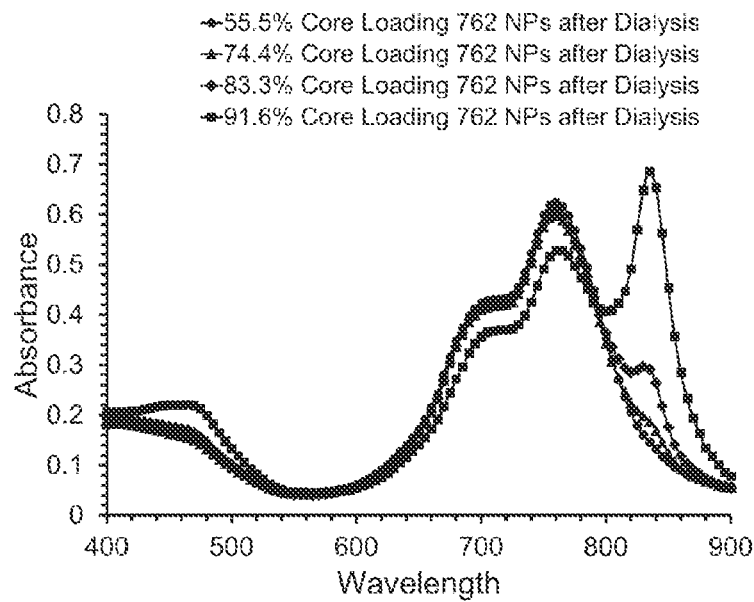
FIG. 15B. Graph of UV-VIS spectra, indicating absorbance of 762Pc nanoparticles made with a sequential FNP system (CIJ-CIJ) at various core loadings after dialysis.
Figure 15C:
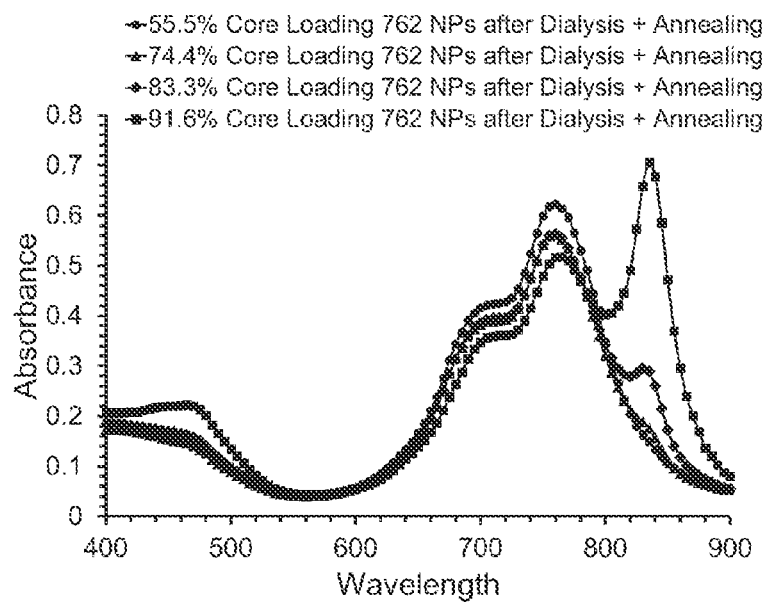
FIG. 15C. Graph of UV-VIS spectra, indicating absorbance of 762Pc nanoparticles made with a sequential FNP system (CIJ-CIJ) at various core loadings after dialysis and annealing.

Example 15: Absorbance and Fluorescence of Nanoparticles with Increasing Core Loadings of 1,4,8,11,15,18,22,25-Octabutoxy-29H,31H-phthalocyanine 1,4,8,11,15,18,22,25-Octabutoxy-29H,31H-phthalocyanine (herein, "762Pc") is a medical imaging contrast agent with demonstrated applications in positron emission tomography (PET) and photoacoustic imaging (PAD. 762Pc has a log P of about 10.49 and negligible water solubility. Polyetheretherketone (PEEK) tubing with ID=0.75 mm, OD=1.58 mm, and length=250 mm was used to connect the outlet of one CIJ to the inlet of another CIJ. The residence time between the two mixers was calculated based on fluid velocity to be about 50 ms. 762Pc was dissolved in tetrahydrofuran (THF) at 12.5 mg/mL. Polystyrene-b-poly(ethylene glycol) (PS-b-PEG) with 1.6 kDa polystyrene block and 5.0 kDa poly(ethylene glycol) block was dissolved in THF at 5 mg/mL, 2.5 mg/mL, 1.25 mg/mL and at 0.625 mg/mL. In the first CIJ mixer, 2 mL of the 762Pc solution in THF was rapidly mixed with a 2 mL of 0.1M NaCl solution in MilliQ water. After a residence delay in the connection tube, the resulting solution was mixed against 4 mL of PS-b-PEG in THF solution and quenched into a 42 mL reservoir of stirring 0.1M NaCl solution in MilliQ water. If 5 mg/mL PS-b-PEG was used, the resulting nanoparticles are at 55.5% core loading. If 2.5 mg/mL PS-b-PEG was used, the resulting nanoparticles are at 71.4% core loading. If 1.25 mg/mL PS-b-PEG was used, the resulting nanoparticles are at 83.3% core loading. If 0.625 mg/mL PS-b-PEG was used, the resulting nanoparticles are at 91.6% core loading. Nanoparticles were dialyzed against MilliQ water through a 3.5 kDa Spectra/Por 3 dialysis membrane for 48 hours. After dialysis, nanoparticles were annealed by incubating at 50 C for 24 hours in a heated water bath. UV-VIS spectrum from 400 nm to 900 nm was taken for all nanoparticle samples after formulation, after dialysis and after annealing (FIG. 15A, 15B, 15C). Initially, UV-VIS spectrums were constant for all core loading conditions. However, after dialysis and after annealing, an absorbance peak at 830 nm appeared for higher loading nanoparticle formulations (83%, 92%). The 830 nm peak for 92% core loading NPs was stronger than that of 83% core loading NPs.

Figure 15D:
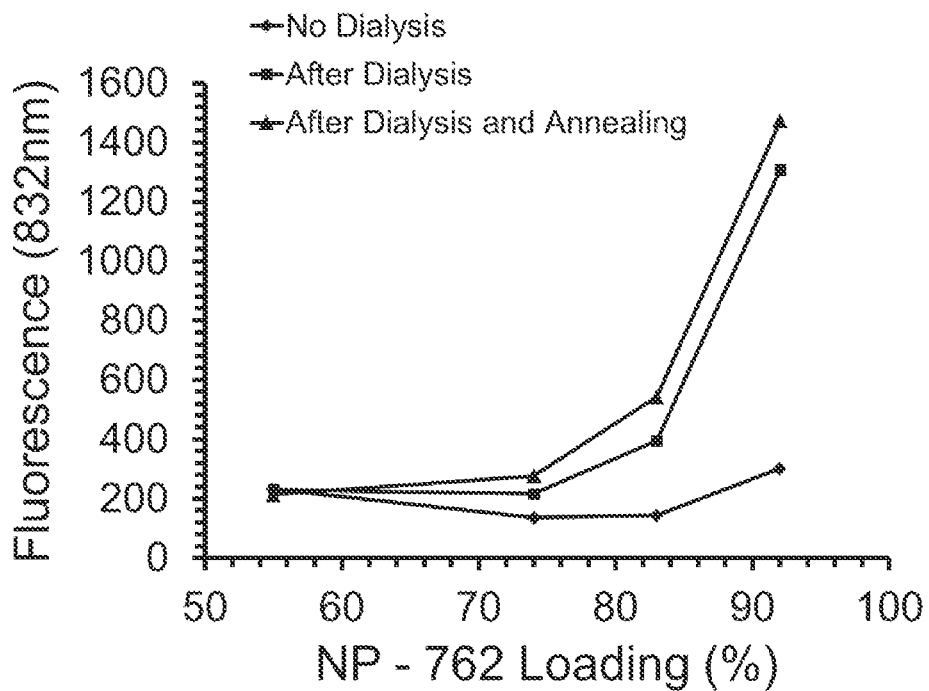
FIG. 15D. Graph showing fluorescence signal at 832 nm for various 762Pc nanoparticles made with a sequential FNP system (CIJ-CIJ). Nanoparticles were diluted 48-fold and excited using a 700 nm laser.

All nanoparticles were then diluted 48-fold into MilliQ water. Fluorescence for all samples was measured at an excitation wavelength of 700 nm and an emission wavelength of 832 nm (FIG. 15D). Surprisingly, higher core loading 762Pc nanoparticles that have been dialyzed and/or annealed showed increased levels of fluorescence emission at 832 nm. Previously, 762Pc nanoparticles formed using traditional FNP demonstrated self-quenching with increased core-loading. Hence, this sequential FNP system could enable more ordered packing of actives in a NP core, with applications in fluorescence imaging.

Figure 16A:
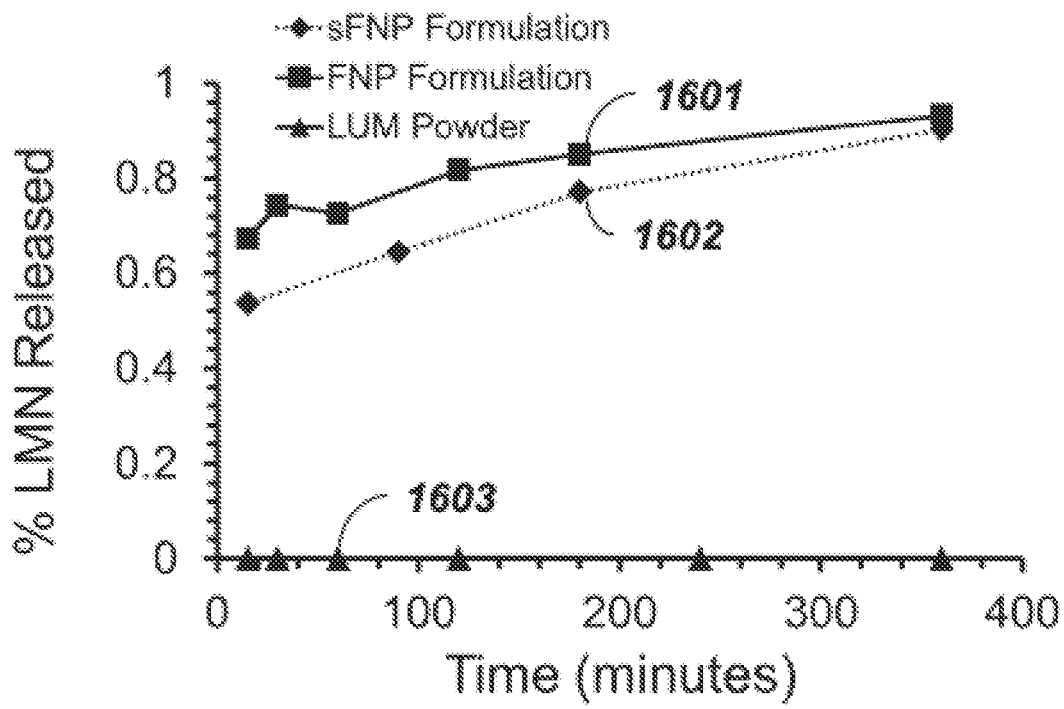
FIG. 16A. Graph showing the dissolution and release of Lumefantrine from nanoparticles (LMN) as a percentage of the total reference Lumefantrine in the bulk, for sFNP nanoparticles, FNP nanoparticles, and lumefantrine powder, using Fasted State Simulated Intestinal Fluid (FaSSIF).
Figure 16B:
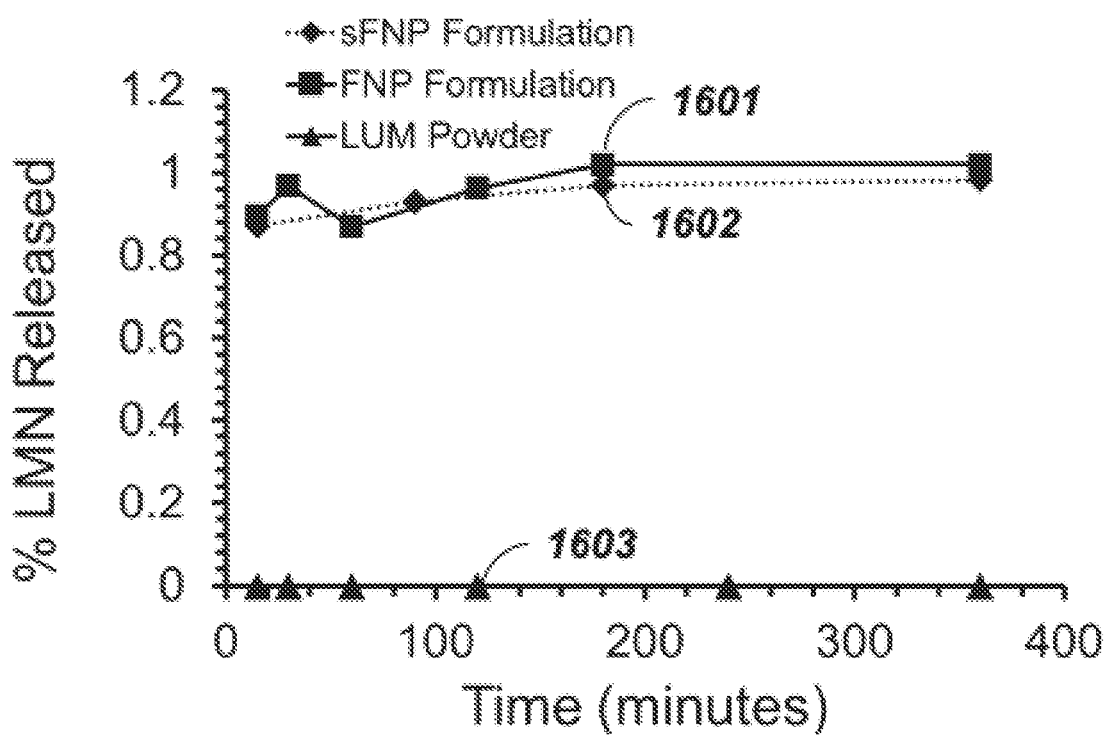
FIG. 16B. Graph showing the dissolution and release of Lumefantrine from nanoparticles (LMN) as a percentage of the total reference Lumefantrine in the bulk, for sFNP nanoparticles, FNP nanoparticles, and lumefantrine powder, using Feasted State Simulated Intestinal Fluid (FeSSIF).
Figure 16C:
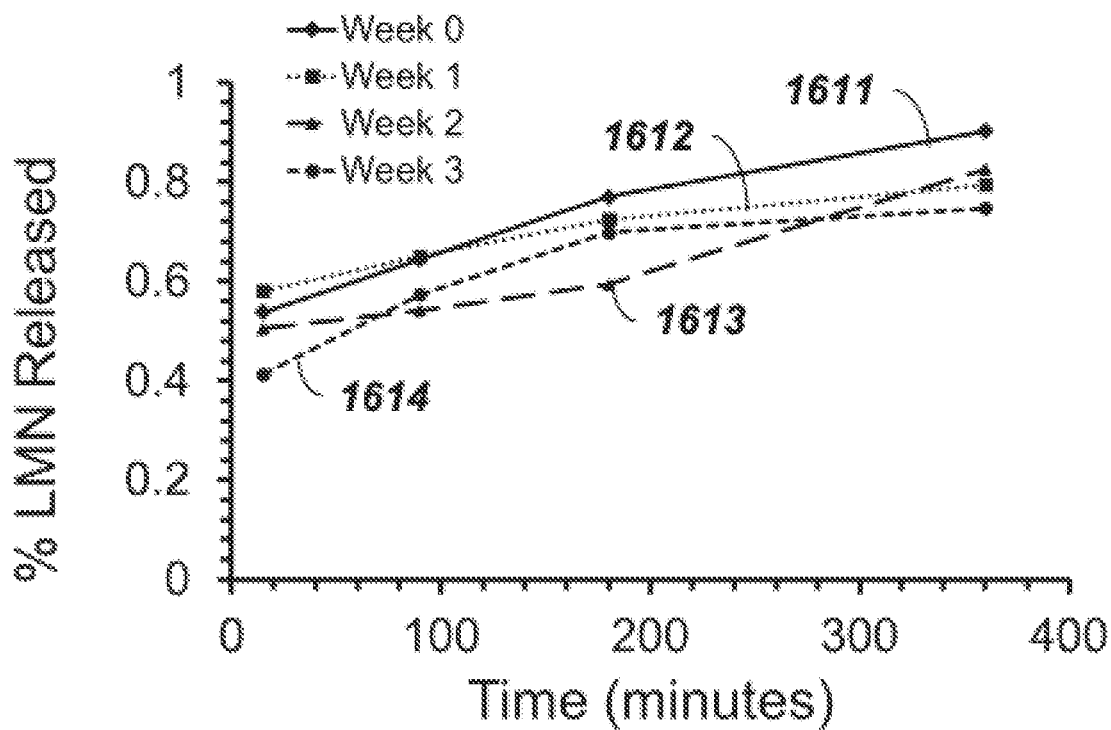
FIG. 16C. Graph showing the dissolution and release of Lumefantrine from nanoparticles (LMN) as a percentage of the total reference Lumefantrine in the bulk, for sFNP nanoparticles, using Fasted State Simulated Intestinal Fluid (FaSSIF), after initial spray drying and then after 1 week, 2 weeks, and 3 weeks of incubation.
Figure 16D:
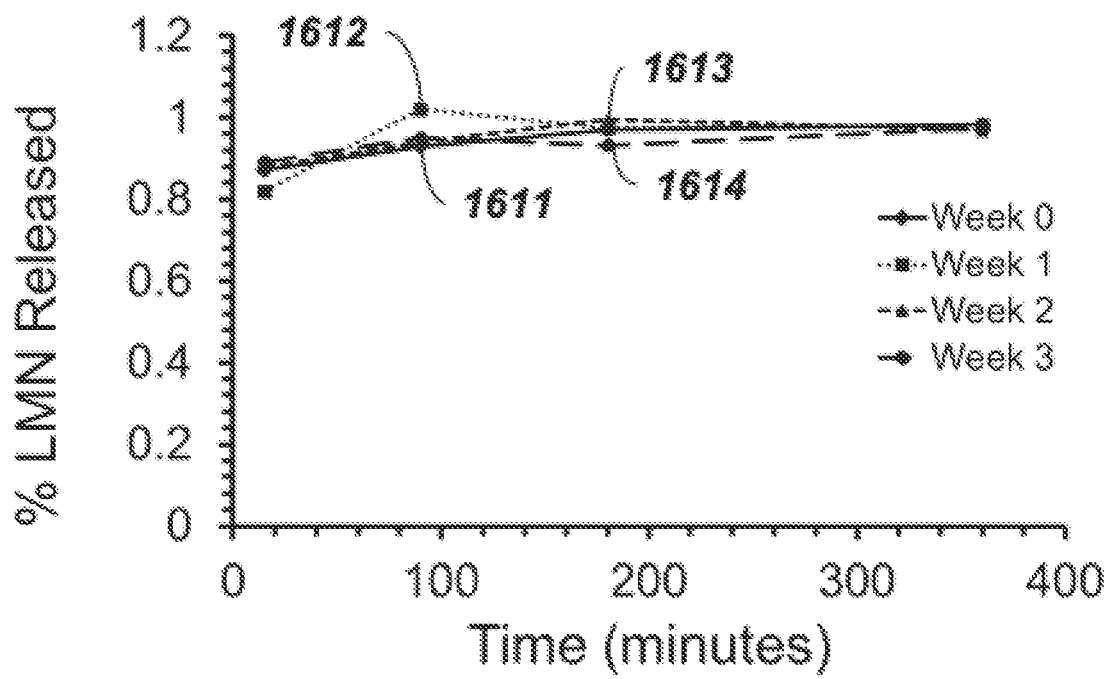
FIG. 16D. Graph showing the dissolution and release of Lumefantrine from nanoparticles (LMN) as a percentage of the total reference Lumefantrine in the bulk, for sFNP nanoparticles, using Feasted State Simulated Intestinal Fluid (FeSSIF), after initial spray drying and then after 1 week, 2 weeks, and 3 weeks of incubation.

Example 16: API Release and Dissolution from High-Loading Lumefantrine-Loaded HPMCAS Nanoparticles Using Sequential FNP Lumefantrine (LUM) nanoparticles were formulated using HPMCAS stabilizer at 83.3% core loading with sizes of around 106 nm and polydispersity index (PDI) of around 0.18—as described previously in Example 5. METHOCEL HPMC E3 (HPMC-E3) was obtained from the Dow Chemical Company (Midland, MI) and added to the nanoparticle solution at a 1:1 ratio relative to the nanoparticle mass. The resulting solution was spray dried (Mini Spray Dryer B-290, Buchi, DE, US) at an inlet temperature of 120 C and flowrate of 5 mL/min to generate LUM nanoparticle powder. Dissolution of LUM from nanoparticles was performed in biorelevant media which included Fasted State Simulated Gastric Fluid (FaSSGF), Fasted State Simulated Intestinal Fluid (FaSSIF) and Feasted State Simulated Intestinal Fluid (FeSSIF). All biorelevant media were obtained from Biorelevant.com (London, UK) and used as prescribed. LUM nanoparticle powders were first dispersed in FaSSGF for 30 minutes at a LUM concentration of 50 ug/mL. At the end of 30 minutes, 1 mL of the FaSSGF solution was transferred to 9 mL of either FaSSIF or FeSSIF solution. Aliquots are taken at timepoints ranging from 15 to 360 minutes of incubation and centrifuged at 24000 g for 10 minutes. The supernatant fraction is stored for LUM quantification. At the end of 360 minutes, 1 mL from the bulk release medium was taken as the reference total LUM concentration. Both the supernatant and bulk samples were lyophilized for 48 hours, followed by redispersion into 1:9 THF to acetonitrile. The concentration of LUM was tested using High Performance Liquid Chromatography (HPLC). The mobile phase is a 4 to 6 ratio of water to acetonitrile mixture at 45 C. Absorbance peaks were measured at 266 nm and 347 nm to quantify LUM concentration. Percentage release was calculated as concentration of LUM detected at one time point divided by the total reference LUM amount in the bulk. At 360 minutes, nanoparticles exhibited around 90% release in FaSSIF and 98% release in FaSSIF. Referring to FIGS. 16A and 16B, LUM release from sFNP nanoparticles (1602) are similar to that of particles formulated using traditional FNP methods (1601) as described in prior studies (See Feng, J., Markwalter, C. E., Tian, C. et al. Translational formulation of nanoparticle therapeutics from laboratory discovery to clinical scale. J Transl Med 17, 200 (2019)) in both FaSSIF (FIG. 16A) and FeSSIF (FIG. 16B) and far exceed release profiles for LUM powder (1603). Referring to FIGS. 16C and 16D, dry nanoparticle powder after spray drying was also evaluated for shelf stability through an open-vial incubation at 50 C and 75% relative humidity (1611). Powders were sampled after 1 week (1612), 2 weeks (1613) and 3 weeks (1614) of incubation and tested for LUM release in both FaSSIF and FeSSIF conditions as described above. No significant changes to the LUM release and dissolution properties of the sFNP nanoparticles were found after 3 weeks of incubation at 50 C and 75% RH in either FaSSIF (FIG. 16C) or FeSSIF (FIG. 16D) conditions.

Further description of the disclosed approach is included in the Appendix which is part of the application and is incorporated by reference in its entirety as if fully set forth herein. The Appendix contains FIGS. 1-15D, and includes a presentation titled "Series Flash Nanoprecipitation for the Scalable Formulation of Nanoparticles with Ultra-High Core Loading for Imaging and Drug Delivery Applications".

What is claimed is:

1. A method for encapsulating a hydrophobic agent comprising:
    (a) dissolving the hydrophobic agent in a less polar process solvent to form a first process solution;
    (b) dissolving an amphiphilic stabilizer in a less polar process solution to form a second process solution, the amphiphilic stabilizer comprising at least one less polar region and at least one more polar region;
    (c) continuously mixing the first process solution with a more polar antisolvent stream to precipitate the hydrophobic active and form a mixed solution; and
    (d) continuously mixing the mixed solution with the second process solution to form a stabilized nanoparticle,
    wherein steps (c) and (d) are conducted in different confined mixing chambers wherein each chamber has two or more inlets and an exit whereby the solution streams continuously flow into and out of the mixing chambers,
    wherein the stabilized nanoparticle comprises a core and a shell,
    wherein the core comprises the hydrophobic active, and
    wherein the shell comprises the at least one less polar region of the amphiphilic stabilizer.

2. The method according to claim 1, where a delay time is introduced between the two mixing chambers.

3. The method according to claim 2, where the delay time is 5 ms to 1 min.

4. The method according to claim 2, where the delay time is 10 ms to 0.1 min.

5. The method according to claim 2, wherein the mixed solution is transported to the confined mixing chamber where the second process solution is mixed via tubing, and at least one dimension of the tubing is used to create a controlled delay time between mixing.

6. The method according to claim 1, wherein the mixing occurs within multiple confined impingement jet mixers connected in series.

7. The method according to claim 1, wherein the mixing occurs within a confined impingement jet mixer connected to a multi-inlet vortex mixer.

8. The method according to claim 1, wherein the amphiphilic stabilizer is selected from the group consisting of a random copolymer, a block copolymer, a diblock copolymer, a triblock copolymer, a multiblock copolymer, and a branched-comb copolymer.

9. The method according to claim 1, wherein the at least one less polar region of the amphiphilic stabilizer comprises poly(styrene), poly(lactic acid), poly(lactic-co-glycolic acid), or poly(caprolactone).

10. The method according to claim 1, wherein the at least one more polar region of the amphiphilic stabilizer comprises poly(aspartic acid), poly(glutamic acid), or poly(ethylene glycol).

11. The method according to claim 1, wherein the amphiphilic stabilizer includes a cellulosic polymer.

12. The method according to claim 11, wherein the cellulosic polymer comprises hydroxypropyl cellulose, methyl cellulose, ethyl methyl cellulose, hydroxypropylmethyl cellulose, or carboxymethyl cellulose.

13. The method according to claim 11, wherein the cellulosic polymer includes a hydroxypropyl substitution, a hydroxyethyl substitution, a hydroxymethyl substitution, a succinate substitution, an acetate substitution, or a combination thereof.

14. The method according to claim 1, wherein the less polar process solvent is selected from the group consisting of acetone, an alcohol, methanol, ethanol, n-propanol, isopropanol, tetrahydrofuran, dimethyl sulfoxide, and combinations thereof.

15. The method according to claim 1, wherein the more polar anti-solvent is selected from the group consisting of water, an alcohol, and combinations thereof.

16. The method according to claim 1, wherein the more polar anti-solvent contains dissolved salts or buffers.

17. The method according to claim 16, wherein the salt or buffer is selected from the group consisting of sodium chloride, potassium chloride, phosphate buffers, acetate buffers, and combinations thereof.

18. The method according to claim 1, wherein the hydrophobic agent has a molecular weight of from about 100 g/mol to about 5000 g/mol.

19. The method according to claim 1, wherein the hydrophobic agent has a solubility in water of from about 0.001 mg/L to about 100 mg/L.

20. The method according to claim 1, wherein the hydrophobic agent has a log P of from about 3.5 to about 12.

21. The method according to claim 1, wherein the hydrophobic agent is selected from the group consisting of polystyrene homopolymer, polycaprolactone homopolymer, polylactic acid, lumefantrine, clofazimine, cyclosporine A, itraconazole, artefenomel, artefenomel mesylate, tocopherol, tocopheryl acetate, and combinations thereof.

22. The method according to claim 1, wherein the hydrophobic agent is 1,4,8,11,15,18,22,25-octabutoxy-29H,31H-phthalocyanine.

23. The method according to claim 22, wherein the nanoparticle is fluorescent when excited at between 500 nm and 800 nm and excites at above 800 nm.

24. The method according to claim 1, wherein the nanoparticle has a size ranging from about 10 nm to about 5000 nm.

25. The method according to claim 1, wherein the nanoparticle comprises weight fraction of hydrophobic active from about 50% to 95% w/w.

26. The method according to claim 1, wherein the nanoparticle size does not change by more than about 50% over 48 hours in aqueous solution.

27. The method according to claim 1, wherein the nanoparticle size does not change by more than about 50% over 9 months in aqueous solution.

* * * * *